United States Patent
Voyatzakis et al.

(10) Patent No.: US 12,178,212 B1
(45) Date of Patent: Dec. 31, 2024

(54) HEATED PLATEN EXPANSION COMPENSATOR FOR A DOUGH PRESS

(71) Applicant: Somerset Industries, Inc., Lowell, MA (US)

(72) Inventors: Andrew D Voyatzakis, Carlisle, MA (US); George Athanasiadis, Lexington, MA (US)

(73) Assignee: Somerset Industries, Inc., Lowell, MA (US)

( * ) Notice: Subject to any disclaimer, the term of this patent is extended or adjusted under 35 U.S.C. 154(b) by 0 days.

(21) Appl. No.: 18/653,223

(22) Filed: May 2, 2024

Related U.S. Application Data

(60) Provisional application No. 63/499,823, filed on May 3, 2023.

(51) Int. Cl.
*A21C 11/00* (2006.01)
*A47J 37/06* (2006.01)

(52) U.S. Cl.
CPC ......... *A21C 11/006* (2013.01); *A47J 37/0611* (2013.01); *A47J 2037/0617* (2013.01)

(58) Field of Classification Search
CPC ........... A47J 37/0611; A47J 2037/0617; A21C 11/006
USPC .......... 99/372, 376, 377, 378, 379, 391, 393
See application file for complete search history.

(56) References Cited

U.S. PATENT DOCUMENTS

| | | | | |
|---|---|---|---|---|
| 1,684,751 A | * | 9/1928 | Tugendhat | A47J 37/0611 219/466.1 |
| 4,700,619 A | * | 10/1987 | Scanlon | A47J 37/0676 99/422 |
| 4,763,571 A | * | 8/1988 | Bergling | A47J 37/0611 99/426 |
| 5,070,775 A | * | 12/1991 | Blake | A47J 37/0611 99/422 |
| 6,130,416 A | * | 10/2000 | Gabbai | A47J 37/0611 219/524 |
| 2004/0123744 A1 | * | 7/2004 | Bobo | A47J 37/0611 99/372 |
| 2006/0254430 A1 | * | 11/2006 | Nevarez | A47J 37/0611 99/349 |
| 2010/0206180 A1 | * | 8/2010 | Ricchio | A47J 37/0611 99/422 |

FOREIGN PATENT DOCUMENTS

KR   20110020989 A   *   4/2011   ...... A47J 2037/0617

* cited by examiner

*Primary Examiner* — Reginald Alexander
(74) *Attorney, Agent, or Firm* — Altman & Martin; Steven K Martin

(57) ABSTRACT

An expansion compensating coupler comprised of at least two expansion compensating assemblies for mounting a platen to a dough press. One end of a threaded rod is perpendicularly attached to the platen. A nut is turned onto the rod, a washer is placed on the rod, the rod is inserted through the bore of a sleeve residing in a hole in the dough press, a washer is placed on the rod, and a nut is turned onto the rod. The nuts are tightened to secure the platen to the dough press. The sleeve bore has the same diameter as the rod and the outer diameter of the sleeve is smaller than the hole so that there is a gap. Heating the platen causes it to expand and the threaded rod/sleeve to move into the gap. The minimum gap size is the maximum amount of expected expansion of the platen.

13 Claims, 23 Drawing Sheets

HEATED PLATEN EXPANSION COMPENSATOR FOR A DOUGH PRESS

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to dough presses, more particularly, to dough presses with platen heaters to heat the dough during pressing.

2. Description of the Related Art

The typical dough press has a base supporting a lower platen with a lower working surface and an upper frame supporting an upper platen with an upper working surface. A first of the platens is fixed and the second platen is mounted to a mechanism that moves the second platen relative to the first platen between an open position, where the platens are spaced from each other, and a closed position, where dough placed between the platen working surfaces is pressed flat by the working surfaces. In some dough presses, the mechanism moves the upper platen perpendicularly to the platen working surface. In other dough presses, the frame that the lower platen is mounted to is attached to the base by a hinge so that the lower platen is pivoted up to the upper platen.

Some dough presses have electrically heated platens to relax the dough so it spreads more evenly. As is well-known, different materials expand by different amounts when heated. Because the heated platen is composed of a different material then the component of the dough press to which it is attached, it expands by a different amount, causing the platen to warp. When the platen warps, the working surface warps, causing the resultant dough sheet to have a nonuniform thickness. A flattened dough sheet with a non-uniform thickness will not cook uniformly.

BRIEF SUMMARY OF THE INVENTION

The present invention, an expansion compensating coupler for mounting a platen to a dough press, can be employed for use with any style of dough press that has opposed platens where at least one of the platens is heated. The coupler permits a heated platen to expand when heated so that the working surface does not warp.

The coupler is comprised of at least two expansion compensating assemblies. The platen end of a threaded rod is perpendicularly attached to the proximal surface of the platen. Typically, the platen end is turned into a threaded hole in the platen.

A number of hardware elements are mounted to the threaded rod. From closest to the platen, a distal nut is turned onto the threaded rod, a distal washer is placed on the threaded rod, the threaded rod is inserted through the bore of a sleeve residing in a coupler hole in the dough press, a proximal washer is placed on the threaded rod, and a proximal nut is turned onto the threaded rod. The distal nuts of all of the expansion compensating assemblies are adjusted on the threaded rods so that the two platens are parallel to each other when compressing dough, and then the proximal nuts are tightened to secure the platen to the dough press.

In one configuration, the sleeve bore has the same diameter as the threaded rod so that the threaded rod does not move within the bore, and the outer diameter of the sleeve is smaller than the diameter of the coupler hole so that there is a gap between the sleeve and hole wall. Heating the platen causes it to expand away from the platen center while the dough press does not expand, causing the threaded rod to move away from the platen center. The gap between the sleeve and the hole wall allows the sleeve to move. The minimum size of the gap is the determined by the maximum amount of expansion that the platen is expected to exhibit.

Optionally, the sleeve is slightly longer than the length of the coupler hole, on the order of 0.5 mm to 1 mm. Consequently, tightening the nuts only causes the washers to press against the sleeve, not against the dough press surfaces, leaving a gap so that the washers do not bind on the dough press surface.

Alternatively, the sleeve is the same or shorter than the length of the coupler hole so that tightening the nuts causes the washers to press against the dough press surfaces. To prevent the washers from binding, they are composed of or coated with a non-stick material.

In another configuration, the outer diameter of the sleeve is the same size as the coupler hole so the sleeve does not move within the coupler hole, and the bore diameter is larger than the threaded rod so that there is a gap between the bore wall and the threaded rod. Heating the platen causes it to expand away from the platen center while the dough press does not expand, causing the threaded rod to move away from the platen center. The gap between the threaded rod and the bore wall allows the threaded rod to move. The minimum size of the gap is the determined by the maximum amount of expansion that the platen is expected to exhibit.

In a third configuration of the expansion compensating assembly, the platen end of the threaded rod is attached to the platen. From nearest to the platen, a distal nut is turned onto the threaded rod, a distal washer is placed on the threaded rod, the threaded rod is inserted through a coupler hole in the dough press, a proximal washer is placed on the threaded rod, and a proximal nut is turned onto the threaded rod. The distal nuts of all of the expansion compensating assemblies are adjusted on the threaded rods so that the two platens are parallel to each other when compressing dough, and then the proximal nuts are tightened to secure the platen to the dough press.

The coupler hole has a larger diameter than the threaded rod so that there is a gap between the threaded rod and hole wall. Heating the platen causes it to expand away from the platen center while the dough press does not expand, causing the threaded rod to move away from the platen center. The gap between the threaded rod and the hole wall allows the threaded rod to move. The minimum size of the gap is the determined by the maximum amount of expansion that the platen is expected to exhibit.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

The present application hereby incorporates by reference in its entirety U.S. Provisional Patent Application No. 63/499,823, on which this application is based.

Figure 1:
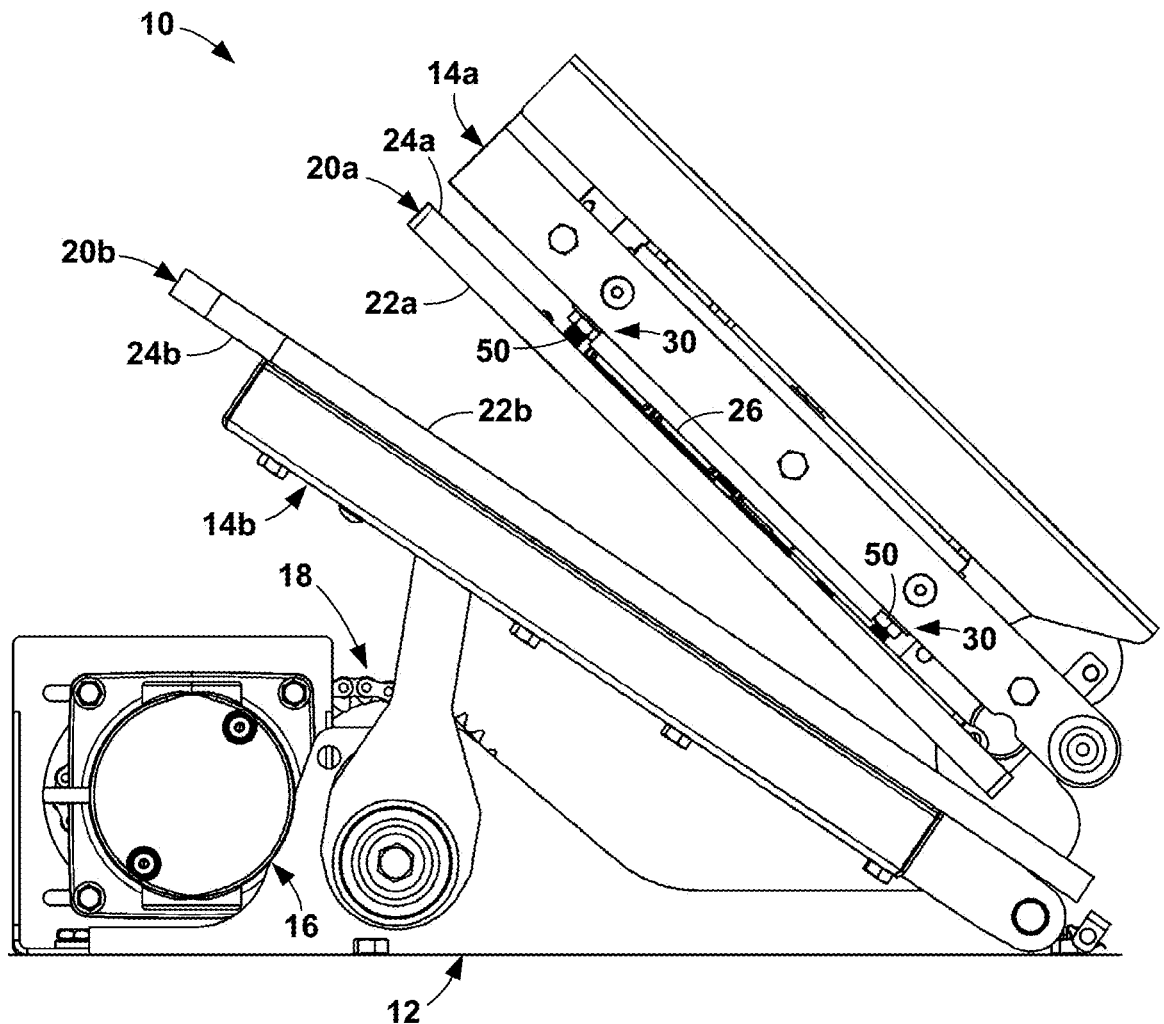
FIG. 1 is an uncovered, side view of a dough press that incorporates the present invention with the upper platen.
Figure 1A:
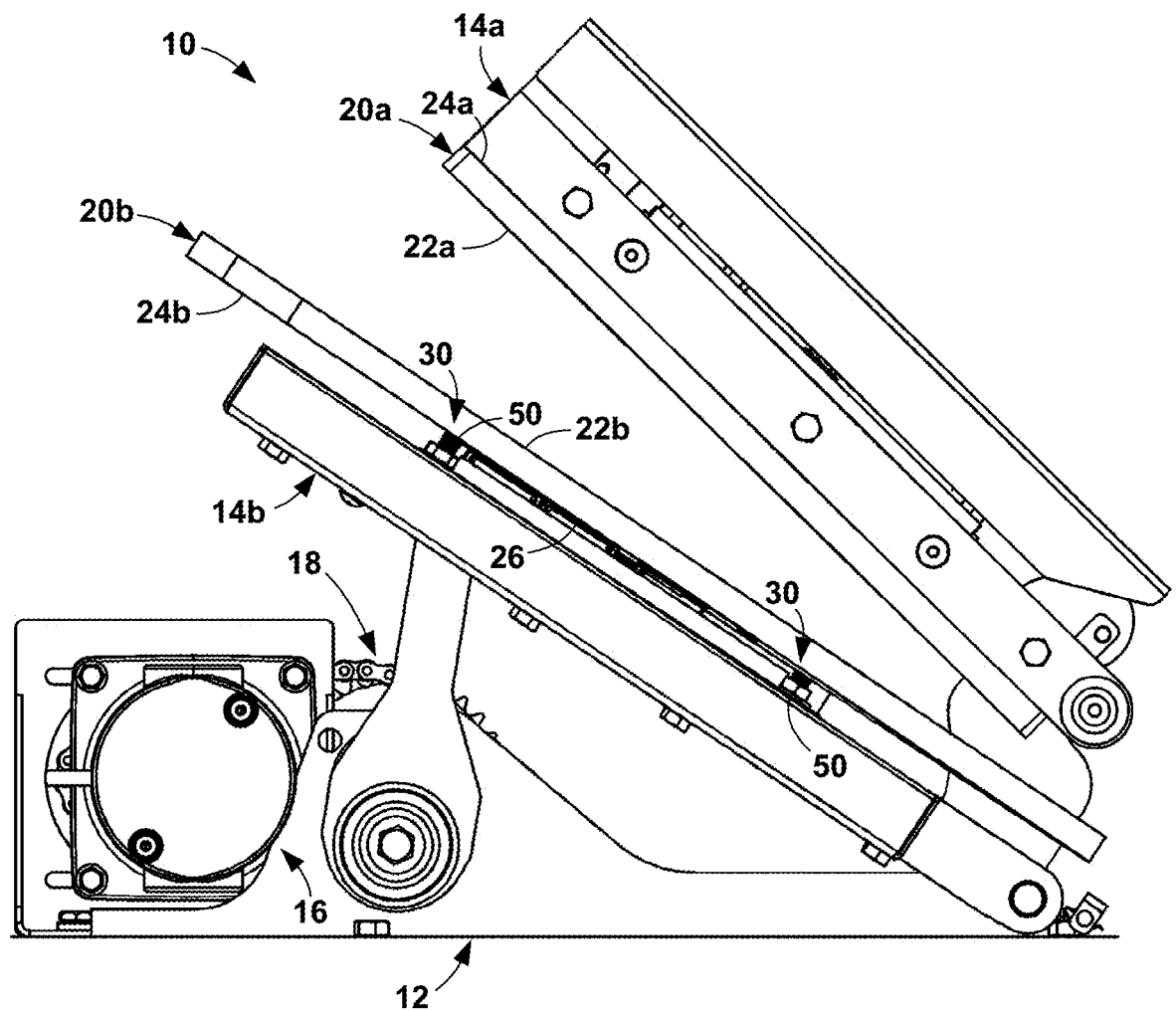
FIG. 1A is an uncovered, side view of a dough press that incorporates the present invention with the lower platen.
Figure 2:
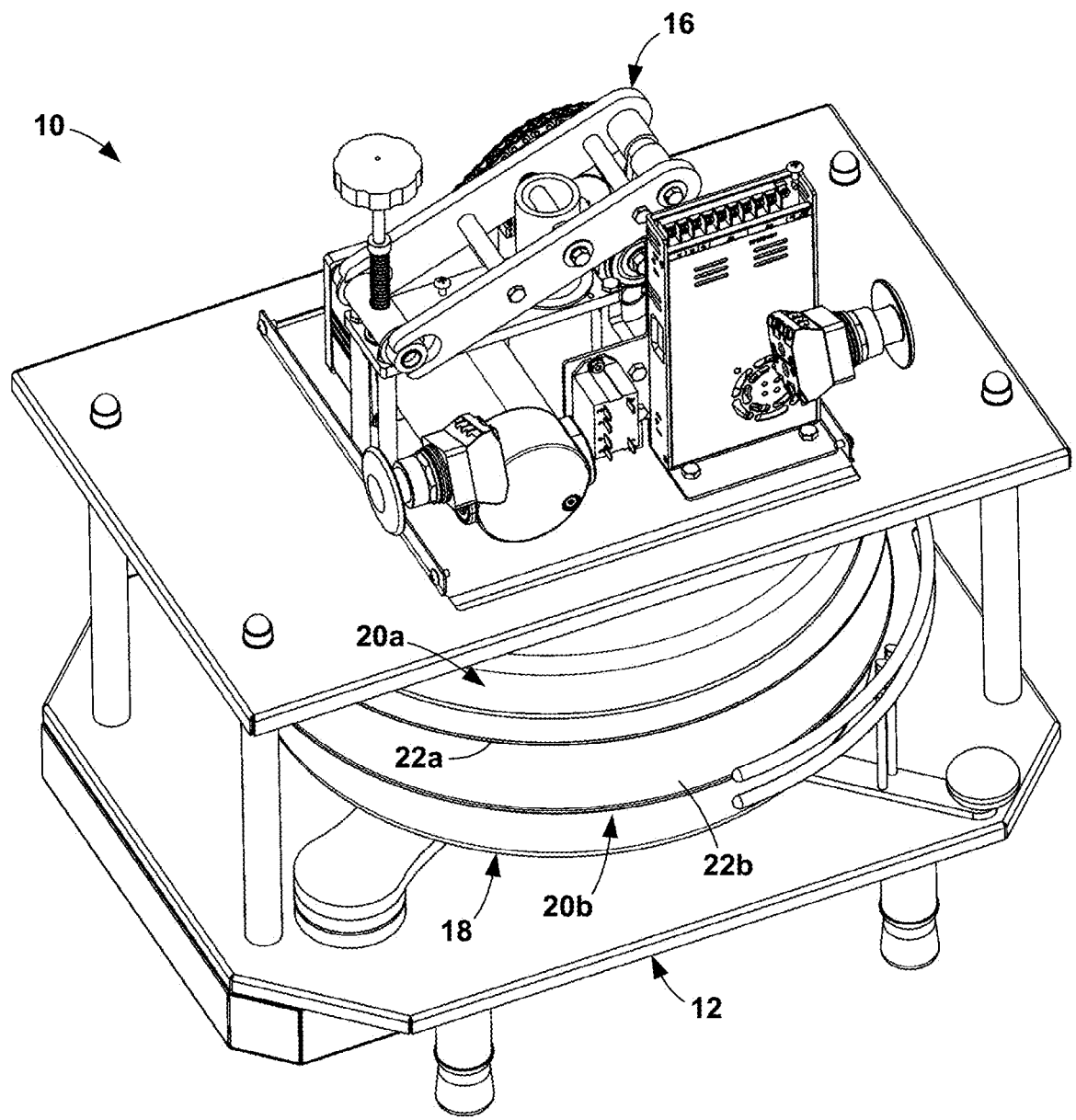
FIG. 2 is an uncovered, side view of another dough press that can incorporate the present invention.

The present invention can be incorporated into any style of dough press that has opposed platens where at least one of the platens is heated, examples of which are shown in FIGS. 1, 1A, and 2. The dough press of FIGS. 1 and 1A has a base 12 with an upper platen 20a and lower platen 20b. The upper platen 20a is attached to an upper frame 14a that is attached to the base 12. The lower platen 20b is attached to a lower frame 14b that is mounted to pivot. A mechanism 16 (typically, a motor and linkage) pivots the lower platen 20b toward and away from the upper platen 20a so that dough is compressed between the platen working surfaces 22a, 22b.

The dough press of FIG. 2 has a base 12 with an upper platen 20a and a lower platen 20b. The lower platen 20b is fixed to the base 12 or to a tray 18 attached to the base 12, and the upper platen 20a is attached to a reciprocating mechanism 16 (typically, a motor or hydraulic piston) that moves the upper platen 20a toward and away from the lower platen 20b so that dough is compressed between the platen working surfaces 22a, 22b. The reciprocating mechanism 16 is attached to the base 12.

Typically, the working surfaces 22a, 22b (collectively, 22) are flat so that the dough press 10 produces a dough sheet of uniform thickness. The working surfaces 22 may have features for shaping the dough, such as, for example, an annular groove to form a raised rim on a pizza crust.

The style of dough press of FIGS. 1 and 1A is used to illustrate the present invention throughout the remainder of the present specification.

One or both of the platens 20a, 20b (collectively, 20) are heated. The heated platen 20 typically has a heating element 26 attached to the proximal surface 24 of the platen 20 opposite the working surface 22. In some presses, the heating element 26 is a large film that is attached to cover the majority of the proximal surface 24a, 24b (collectively, 24). In other presses, the heating element 26 is a set of heating strips attached to the proximal surface 24, as at 28 in FIGS. 3 and 4. As discussed above, heating a platen of one material attached to a different material can cause the working surface to warp so that the flatten dough will have a nonuniform thickness.

The present invention is an expansion compensating coupler 30 for mounting a platen 20 to the dough press 10. For the dough press of FIGS. 1 and 1A, the coupler 30 mounts the platen 20 to the corresponding frame 14a, 14b (collectively, 14). For the dough press of FIG. 2, the coupler mounts the upper platen 20a to the reciprocating mechanism 16 and the lower platen to the base 12/tray 18. The term, "frame 14", will be used hereinafter to refer to the component of the dough press 10 to which the platen 20 is being mounted by the coupler 30.

The coupler 30 permits a heated platen 20 to expand when heated so that the working surface 22 does not warp. The result is a dough sheet of uniform thickness. The present specification illustrates using the coupler 30 of the present invention to mount the upper platen 20a to the upper frame 14a. However, it is clear that the coupler 30 can also be used to mount the lower platen 20b to the lower frame 14b.

Figure 3:
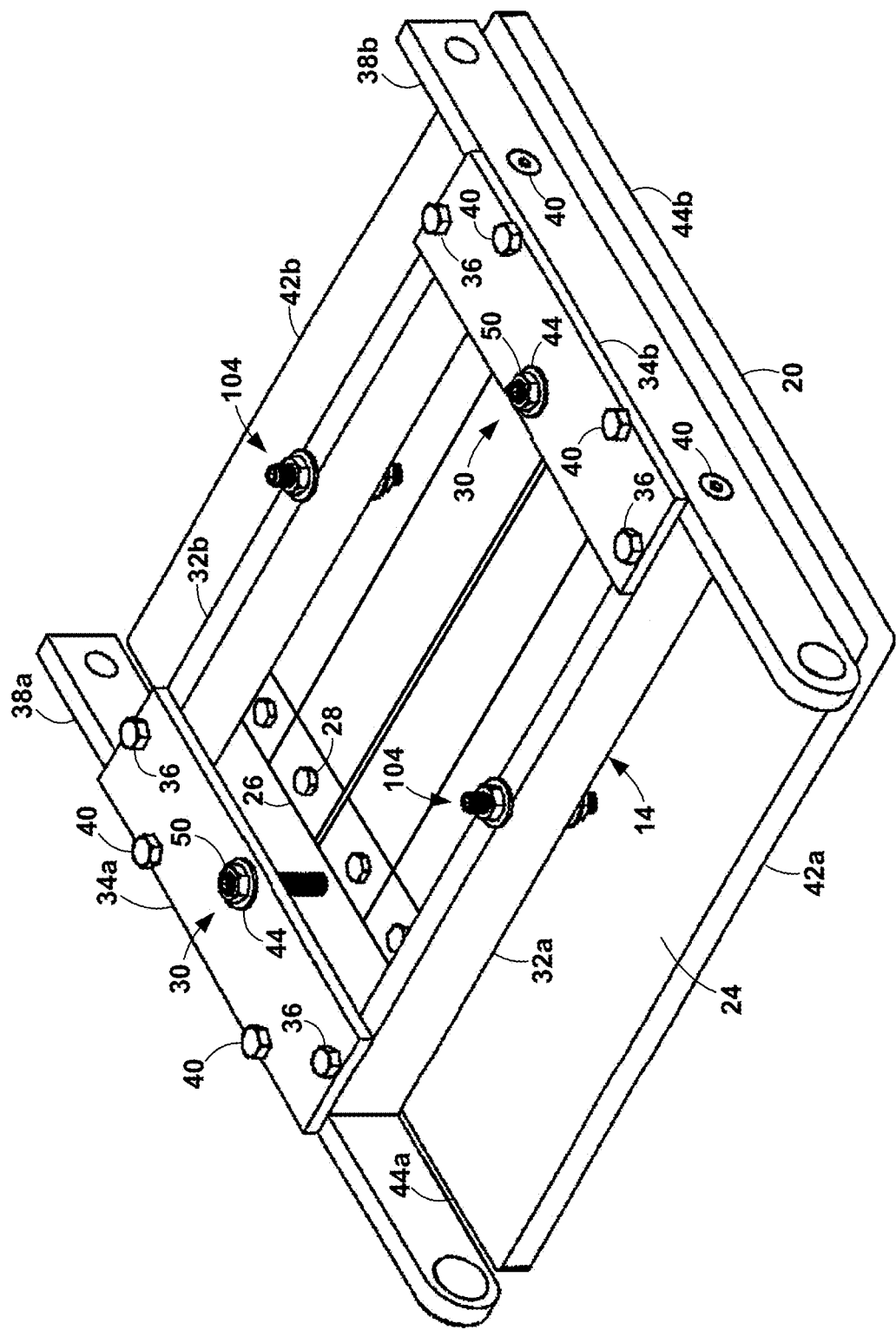
FIG. 3 is a perspective view of a platen mounted to a dough press frame using the coupler of the present invention.
Figure 4:
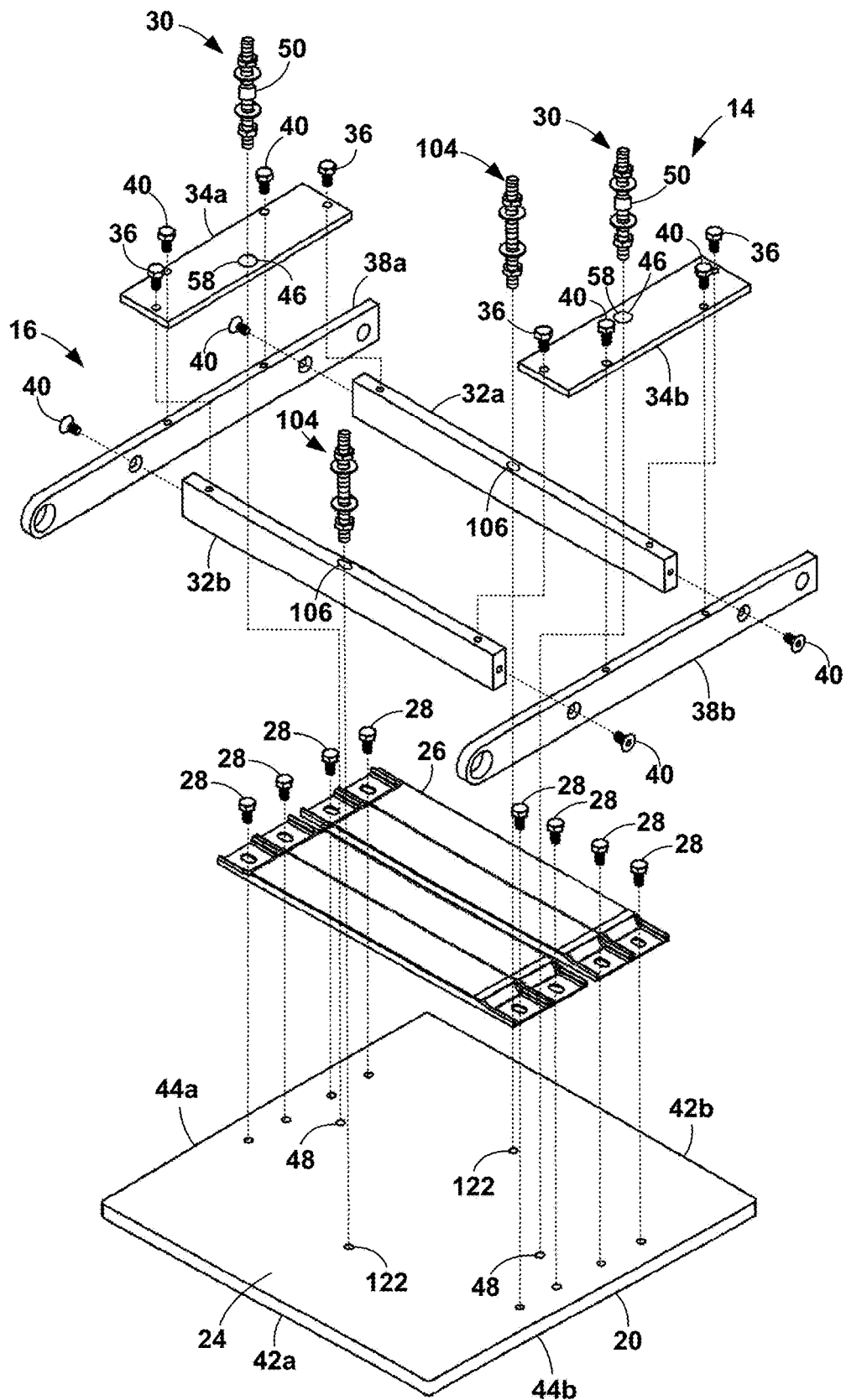
FIG. 4 is an exploded perspective view of the platen mounted to a dough press frame using the coupler of the present invention.
Figure 5:
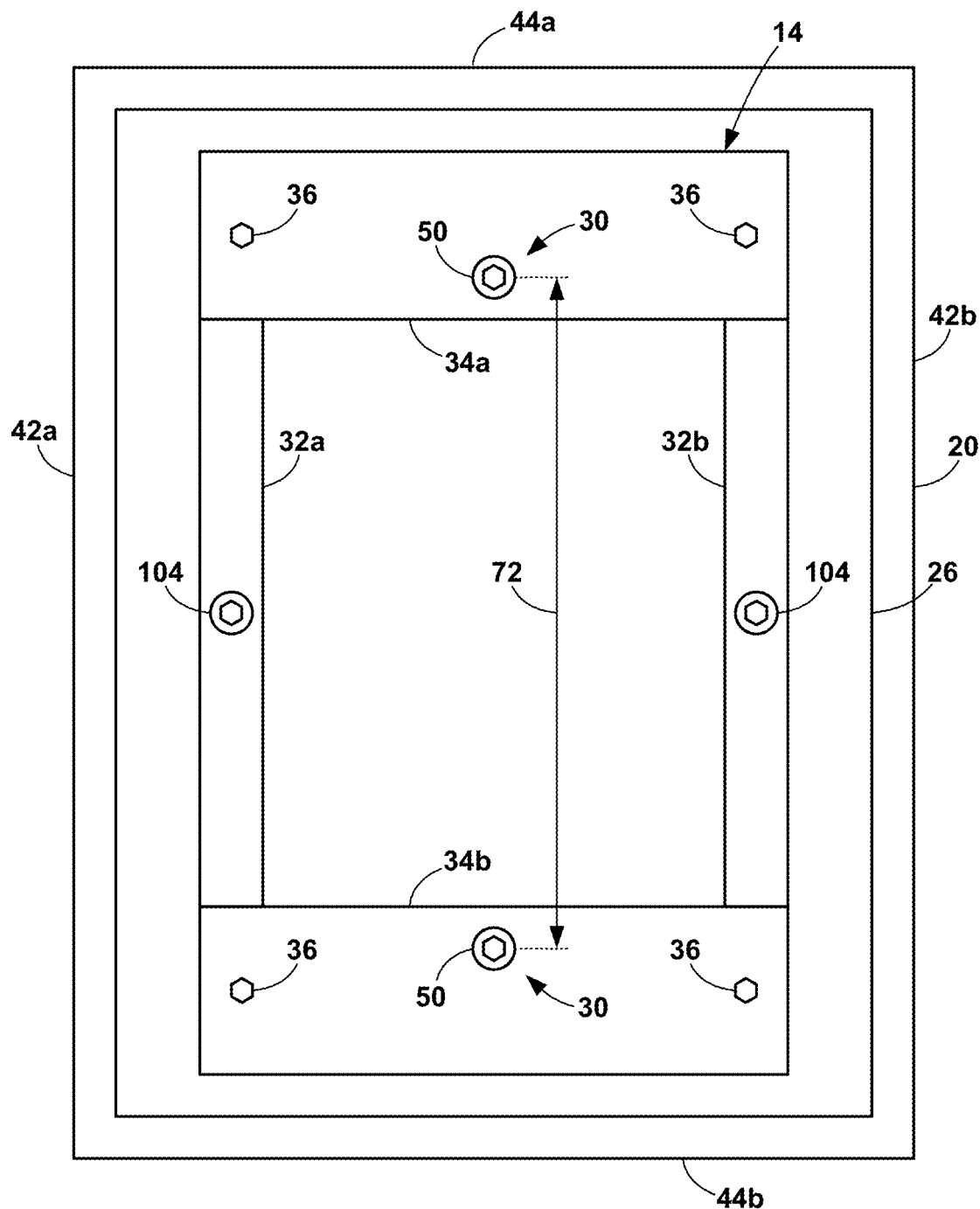
FIG. 5 is a top view of the platen mounted to a dough press frame using the coupler of the present invention.
Figure 6:
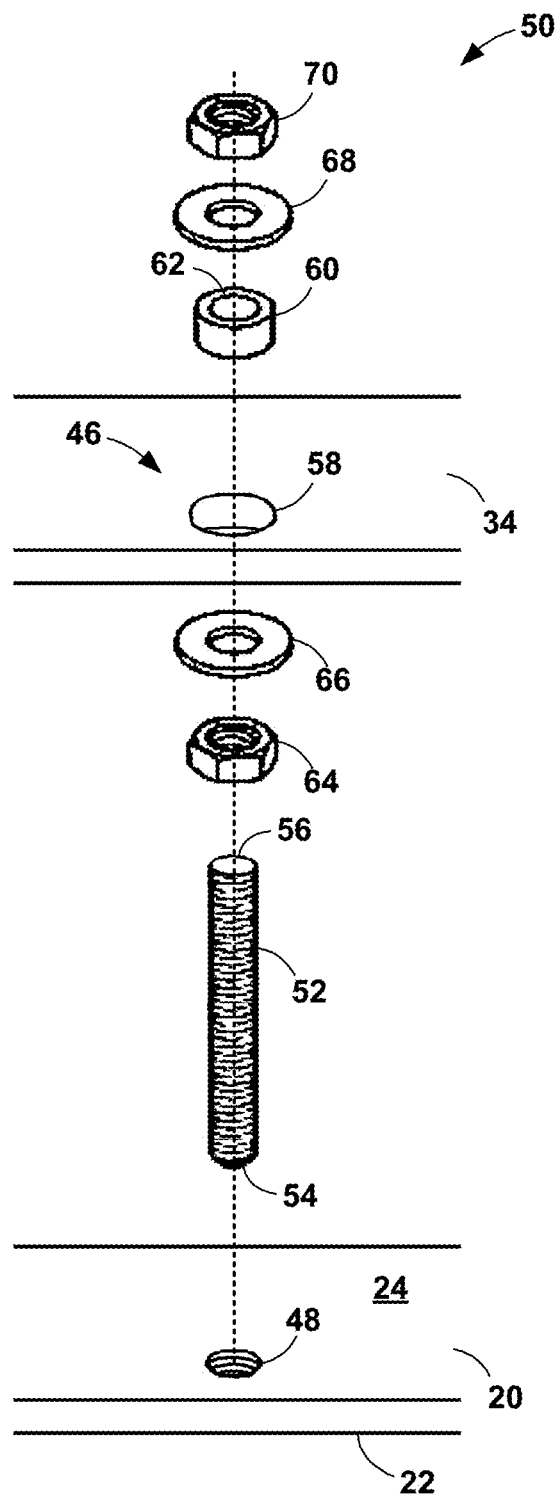
FIG. 6 is an exploded, perspective view a first configuration of the expansion compensating assembly for a thin beam.

As shown in FIGS. 3-5, the platen 20 is attached to the frame 14 using the coupler 30 of the present invention. The platen 20 can be any desired shape, such as circular or rectangular, and the frame 14 can have a corresponding shape. The present invention is agnostic regarding the configuration of the frame 14, and only requires that there be the appropriate number of coupler holes 58 in the frame 14 for the coupler 30, as described below.

The frame 14 of the illustrated dough press 10 is rectangular and is composed in part of six beams. Four of the beams 32a, 32b, 34a, 34b are connected by bolts 36 in a rectangle. In the illustrated frame 14, two of the beams 32a, 32b (collectively, 32) are thicker and the other two beams 34a, 34b (collectively, 34) are thinner. The last two beams 38a, 38b are attached by bolts 40 and connect the frame 16 to the base 12. The term, "expansion point 46," will be used to refer to that part of dough press 10 where a coupler hole 58 is located and may be in a beam 34 described above or may be a component of a different design. For example, the frame 14 may simply be a flat sheet, in which case, the expansion point 46 will be in the flat sheet.

The coupler 30 is comprised of expansion compensating assemblies 50. The number of expansion compensating assemblies 50 that a particular coupler 30 has depends, in part, on the shape of the platen 20. The expansion compensating assemblies 50 are evenly distributed around the platen 20. A circular platen can have as few as three expansion compensating assemblies 50 that are 120° apart. A rectangular platen will typically have either four expansion compensating assemblies 50, one for each of the sides 42, 44, or two expansion compensating assemblies 50, one for each side of one pair of opposed sides 44. When only two expansion compensating assemblies 50 are used, the other two sides 42 have fixed attachments 104. With the illustrated rectangular frame 14 and platen 20, there are two expansion compensating assemblies 50, one for each short side 44 of the platen 20, and two fixed attachments 104, one for each of the long sides 42 of the platen 20.

Two configurations of the expansion compensating assembly 50 are shown in detail in FIGS. 6-17. The platen end 54 of a threaded rod 52 is attached to the proximal surface 24 of the platen 20 so that the threaded rod 52 is perpendicular to the platen 20. The present invention contemplates any acceptable type of attachment including, but not limited to, threads, welding, and adhesives. In the present configuration, the platen end 54 is turned into a threaded hole 48 in the platen 20.

The figures show a threaded rod 52 that is threaded throughout its entire length. The present invention contemplates that the threaded rod 52 does not have to be threaded throughout its entire length but can have smooth, non-threaded sections. For example, if the threaded rod 52 is attached to the platen 20 by welding, the platen end of the threaded rod 52 will not be threaded.

The coupler hole 58 mentioned above at the expansion point 46 is filled by a sleeve 60 with an axial bore 62. From closest to the platen 20 (moving upwardly in the figures from the threaded rod platen end 54 to the frame end 56), a distal nut 64 is turned onto the threaded rod 52, a distal washer 66 is placed on the threaded rod 52, the threaded rod 52 is inserted through the sleeve bore 62, a proximal washer 68 is placed on the threaded rod 52, and a proximal nut 70 is turned onto the threaded rod 52. The outer diameter 98 of washers 66, 68 is at least as large as the outer diameter 92 of the sleeve 60 and preferably larger than the diameter 90 of the coupler hole 58. The distal nuts 64 of all of the expansion compensating assemblies 50 are adjusted on the threaded rods 52 so that the two platens 20 are parallel to each other when compressing dough, and then the proximal nuts 70 are tightened to secure the platen 20 to the frame beams 34.

Figure 7:
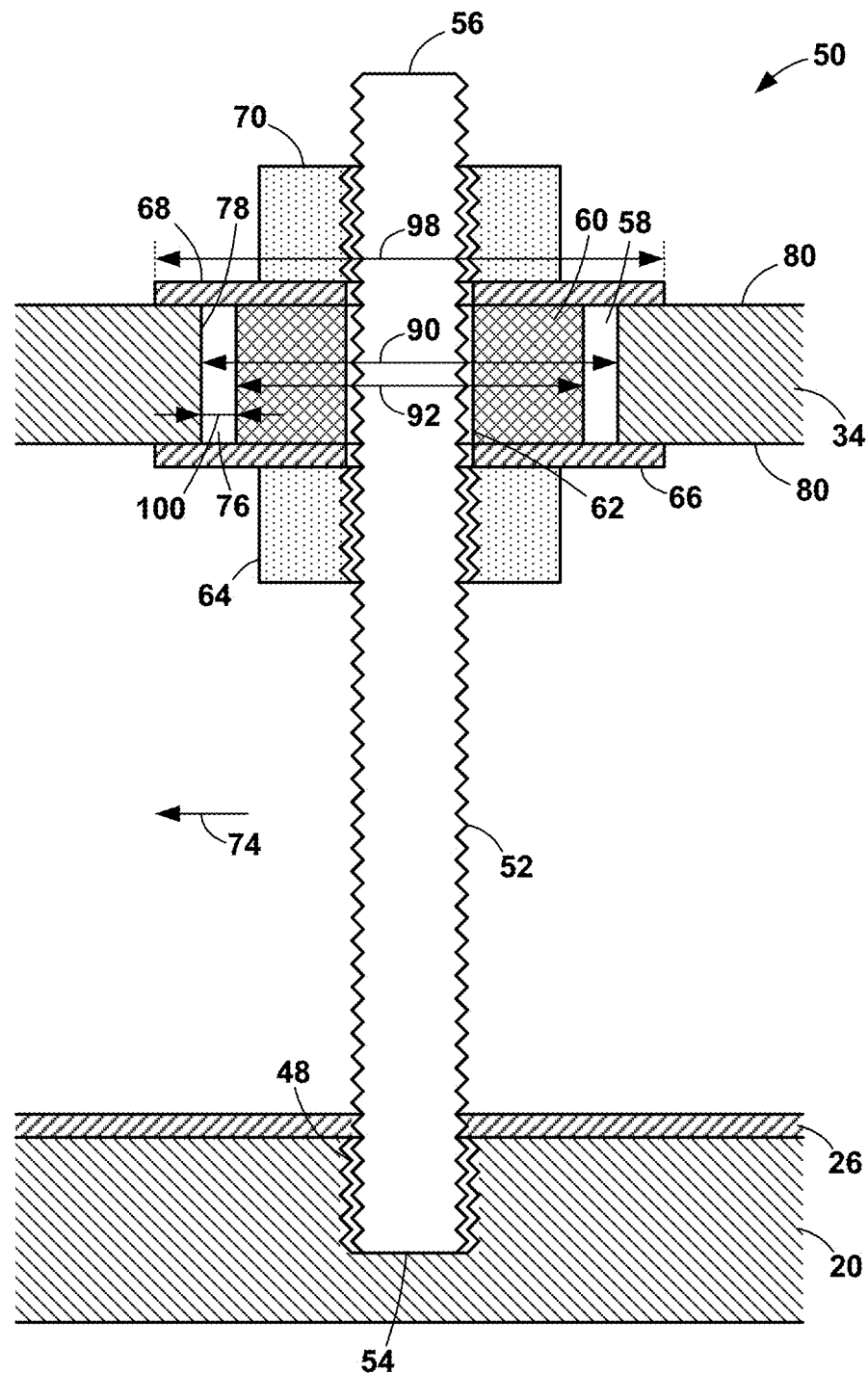
FIG. 7 is a cross-section of the first configuration of the expansion compensating assembly for a thin beam.
Figure 8:
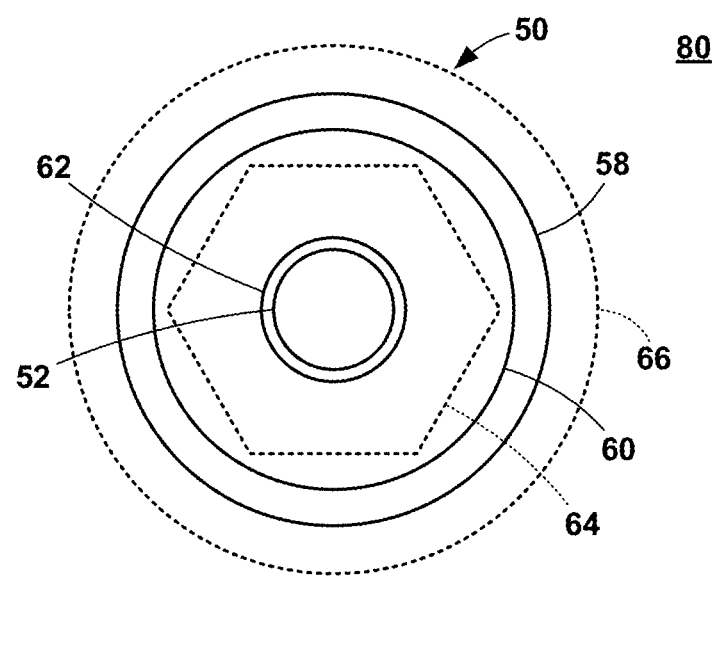
FIG. 8 is a top view/phantom view taken at the beam surface of the configuration of FIG. 7.
Figure 10:
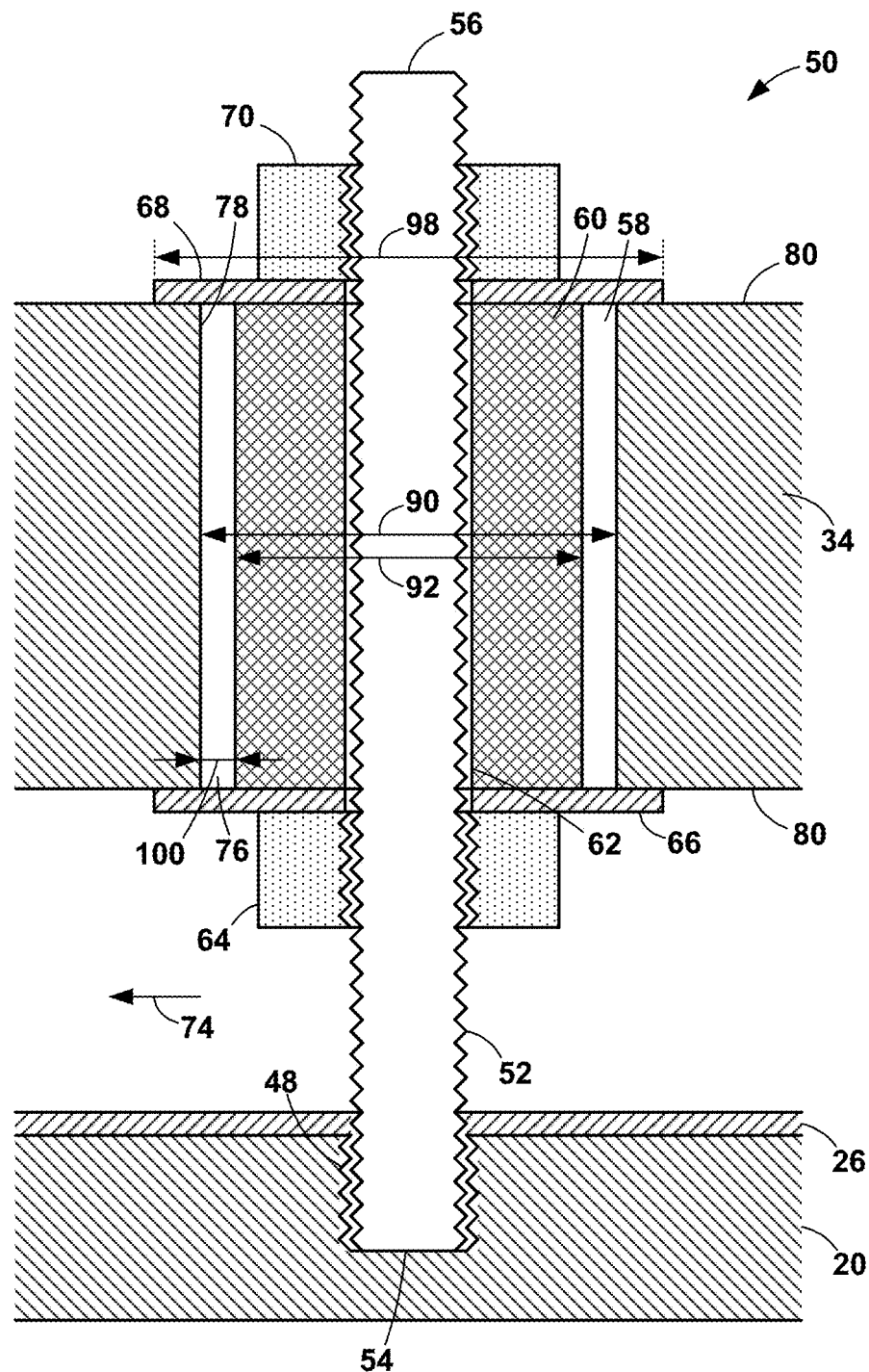
FIG. 10 is a cross-section of the first configuration of the expansion compensating assembly for a thick beam.
Figure 11:
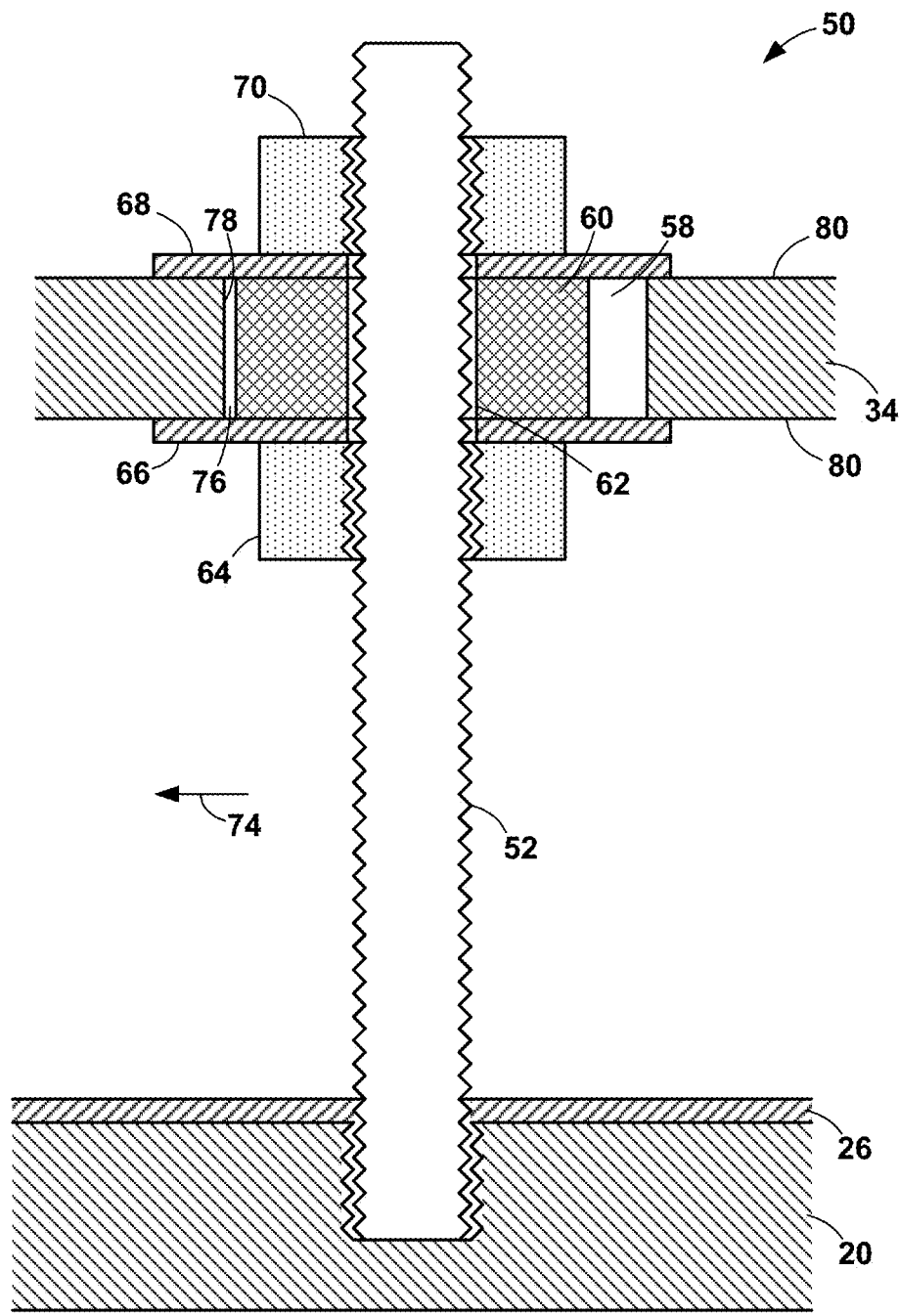
FIG. 11 is a cross-section of the configuration of FIG. 10 after expansion.

FIG. 7 shows the expansion compensating assembly 50 for a thinner expansion point 46 and FIG. 10 shows the expansion compensating assembly 50 for a thicker expansion point 46. It is clear that adapting the expansion compensating assembly 50 for different thicknesses of the expansion point 46 is a simple matter.

In the configuration of FIGS. 5-9, the sleeve bore 62 has the same diameter as the threaded rod 52 so that the threaded rod 52 does not move within the bore 62. Optionally, the bore 62 is threaded and the sleeve 60 is turned on the threaded rod 52. The outer diameter 92 of the sleeve 60 is smaller than the diameter 90 of the coupler hole 58 so that there is a gap 76 between the sleeve 60 and hole wall 78.

Heating the platen 20 causes it to expand away from the platen center in a direction 74 toward the outer edge of the platen 20 while the beam 34 does not expand. The platen expansion causes the threaded rod 52 and sleeve 60 to move in the expansion direction 74. The gap 76 between the sleeve 60 and the hole wall 78 allows the sleeve 60 to move in the expansion direction 74 within the coupler hole 58, as in FIGS. 11 and 13. The platen 20 expands by an amount based on its coefficient of thermal expansion (CTE, $\alpha$), the rate at which a material expands with increase in temperature. Consequently, the minimum size 100 of the gap 76 is the determined by the maximum amount of expansion that the platen 20 is expected to exhibit, which is determined by the material(s) of which the platen 20 is composed and the maximum temperature to which it is heated.

In the present design, the platen 20 is composed substantially of the aluminum alloy 6061-T6, which has a CTE of $2.36 \times 10^{-5}/°$ K, and the platen 20 is heated to a maximum temperature of 400° F. (205° C.=478° K). Assuming an ambient temperature of 72° F. (23° C.), the platen 20 will expand by approximately 0.43%. For a platen 20 where the distance 72 between the expansion compensating assemblies 50 is 12 inches (305 mm), the platen 20 will expand between the expansion compensating assemblies 50 by approximately 0.05 inches (1.27 mm). So, the minimum gap size 100 is 0.025 inches (0.635 mm). In the present design, the sleeve outer diameter 92 is 0.5 inches (12.7 mm) and the coupler hole diameter 90 is 0.55 inches (13.97 mm), which results in the gap 76 being 0.025 inches (0.635 mm).

In general, the minimum gap size 100 is calculated by the formula, minimum gap size=$D\alpha\Delta T/2$, where D is the distance 72 between the expansion compensating assemblies 50, $\alpha$ is the CTE of the platen material, and $\Delta T$ is the maximum platen temperature minus the ambient temperature.

Figure 12:
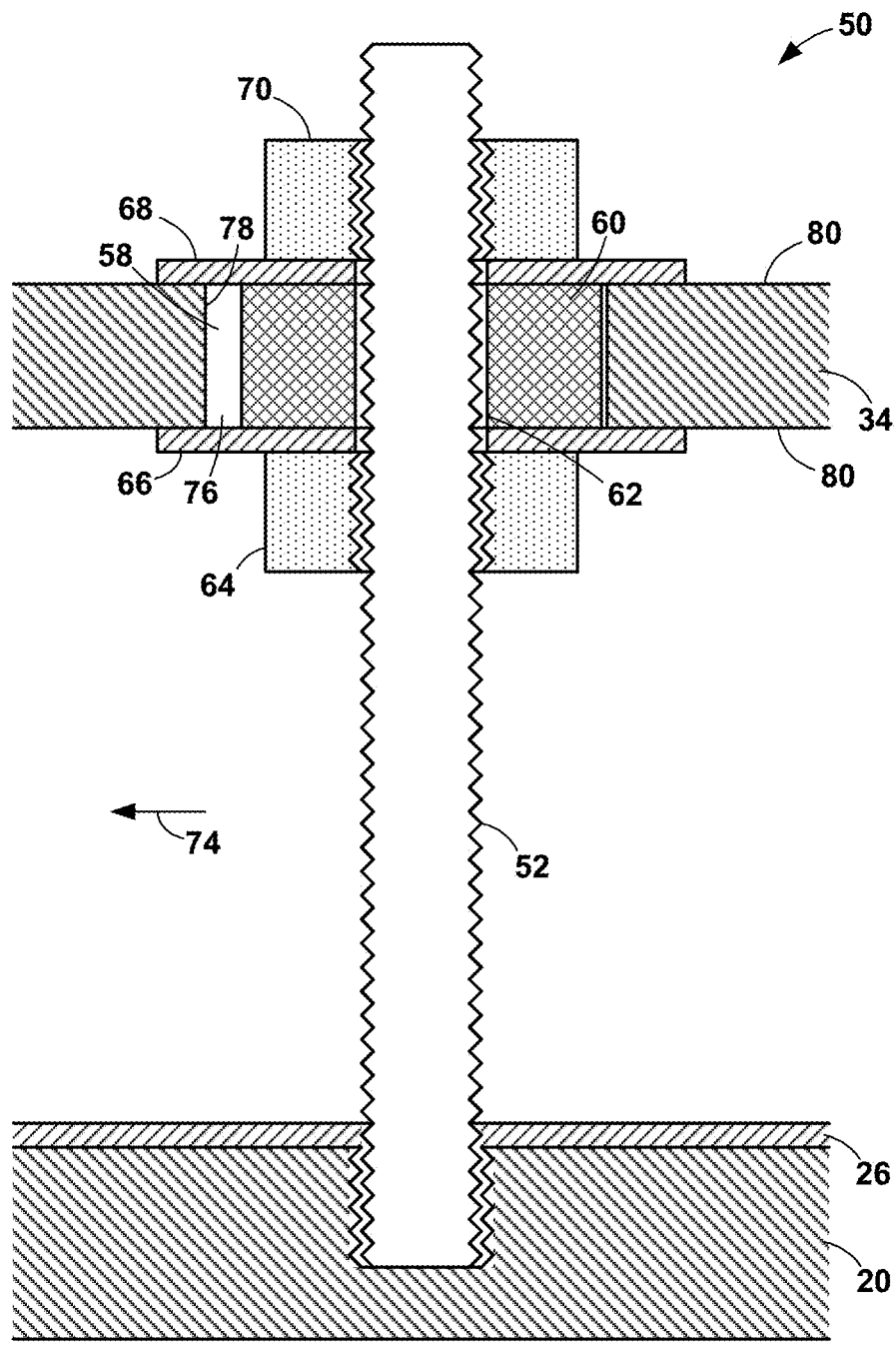
FIG. 12 is a cross-section of the first configuration of the expansion compensating assembly with an offset sleeve.
Figure 13:
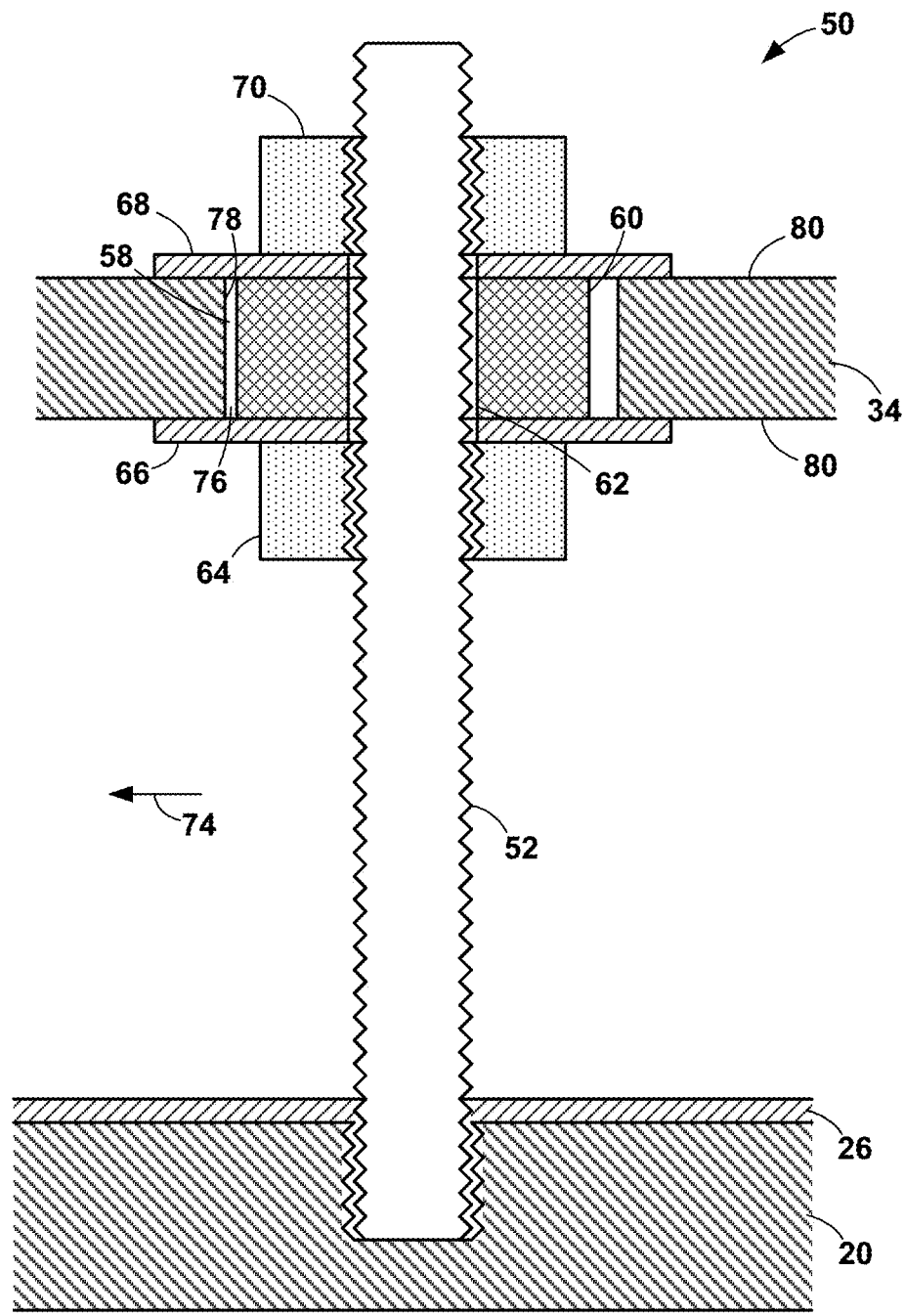
FIG. 13 is a cross-section of the configuration of FIG. 12 after expansion.

In the configuration of FIGS. 5-11, the sleeve 60 is centrally positioned in the coupler hole 58 when the platen 20 is not heated. In the configuration of FIGS. 12 and 13, the sleeve 60 is offset in the coupler hole 58 away from the direction of the expansion 74. In this configuration, the coupler hole 58 can be smaller by the size of the gap 76 but must be offset from the threaded rod 52 in the direction of expansion 74. This configuration is not preferred because, if the press 10 is kept in an environment with a somewhat lower temperature than the ambient temperature where it normally operates, the platen 20 will contract and the coupler 30 may not be able to compensate.

Figure 9:
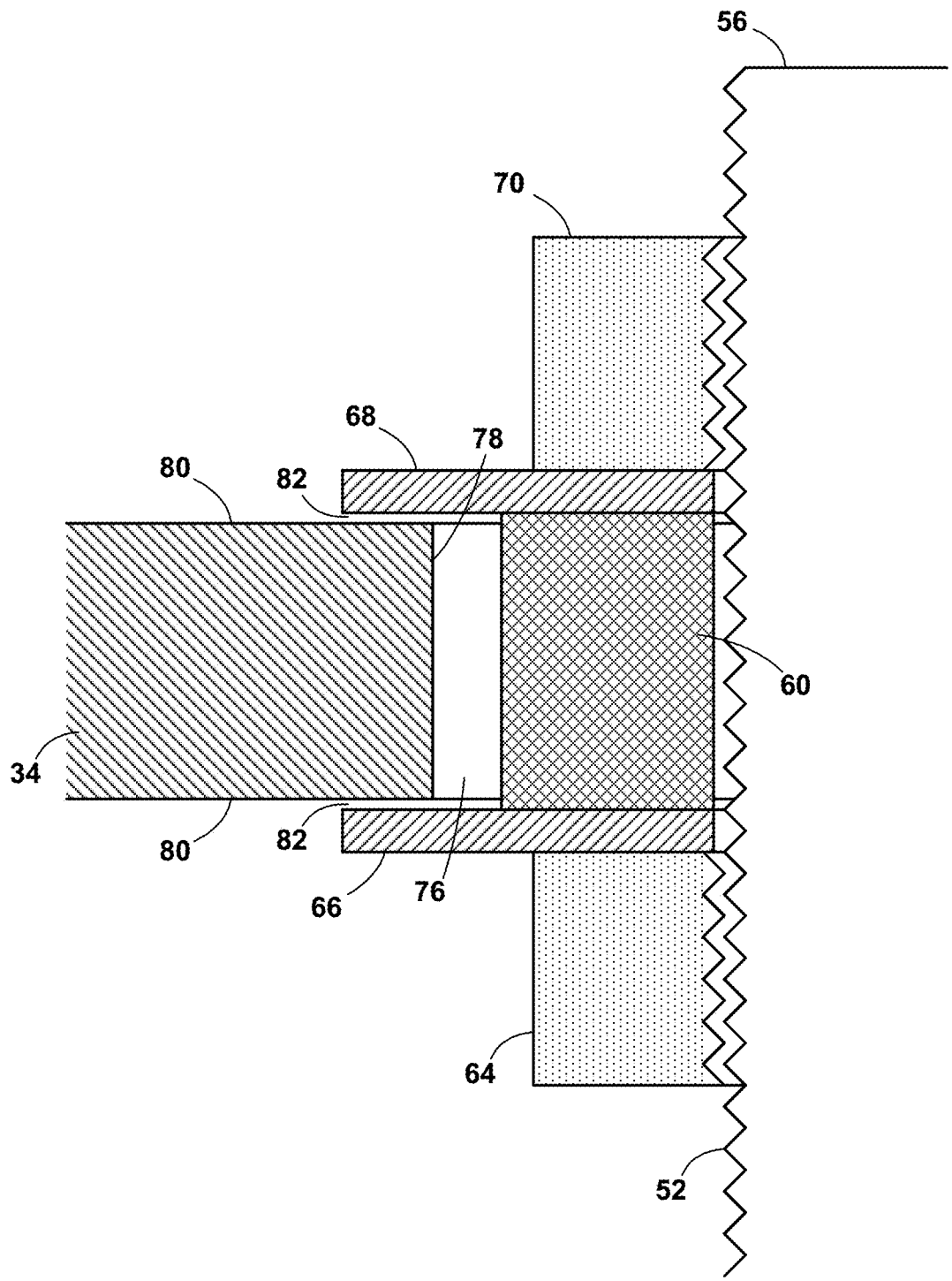
FIG. 9 is a detailed cross-sectional view of the configuration of FIG. 7.

Optionally, the length of the sleeve 60 is slightly greater than the length of the coupler hole 58, on the order of 0.5 mm to 1 mm, as shown in FIG. 9. Consequently, tightening the nuts 64, 70 only causes the washers 66, 68 to press against the sleeve 60, not against the beam surfaces 80, leaving a tiny gap 82 between the washers 66, 68 and the beam surfaces 80. As a result, as the sleeve 60 moves in the coupler hole 58, the washers 66, 68 do not bind on the beam surfaces 80.

Alternatively, the sleeve 60 is the same or shorter than the length of the coupler hole 58. Consequently, tightening the nuts 64, 70 causes the washers 66, 68 to press against the beam surfaces 80. In order for the washers 66, 68 to not bind on the beam surfaces 80, the washers 66, 68 and/or beam surfaces 80 are composed of or coated with a non-stick material.

Figure 14:
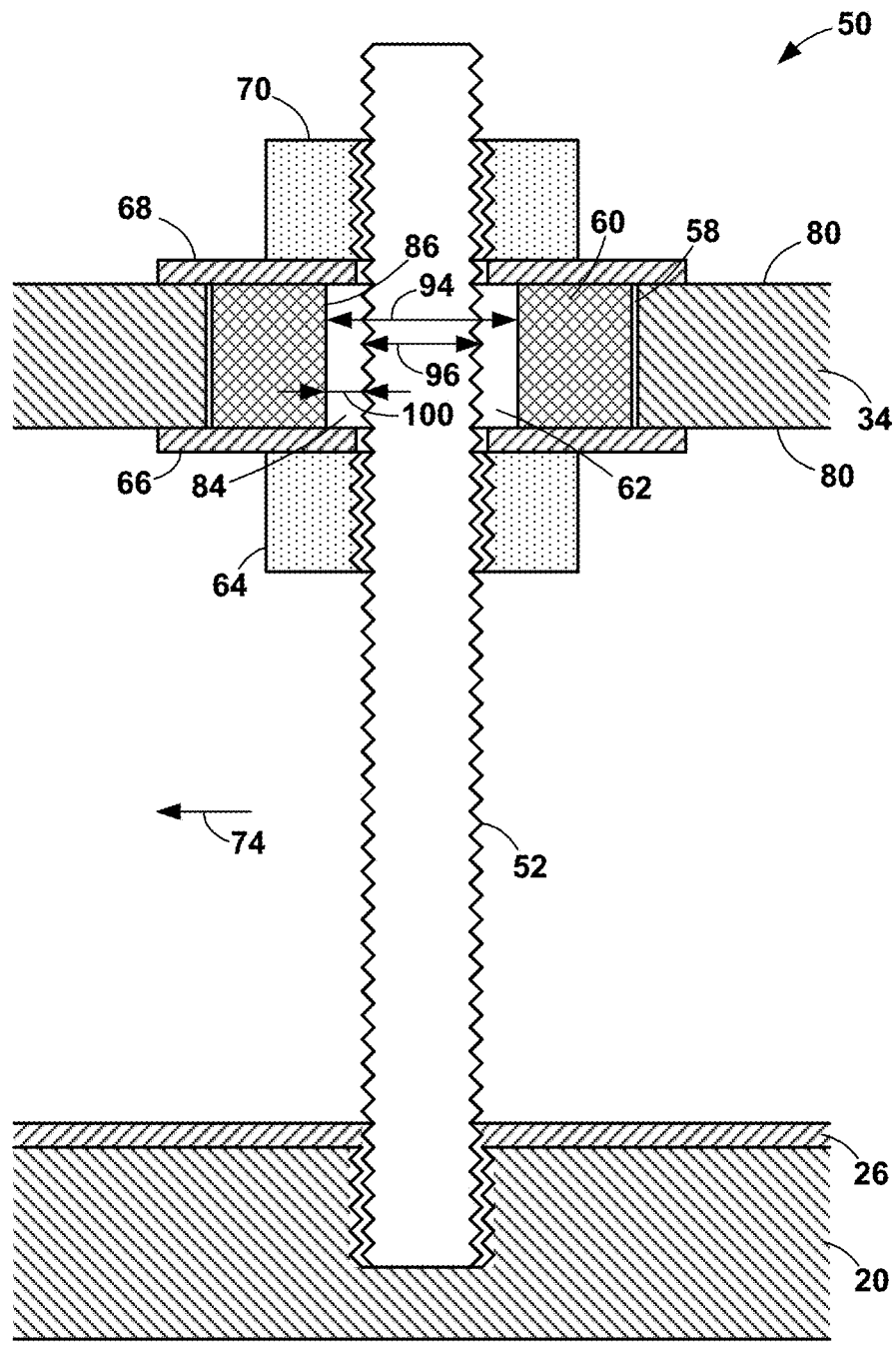
FIG. 14 is a cross-section of a second configuration of the expansion compensating assembly.
Figure 15:
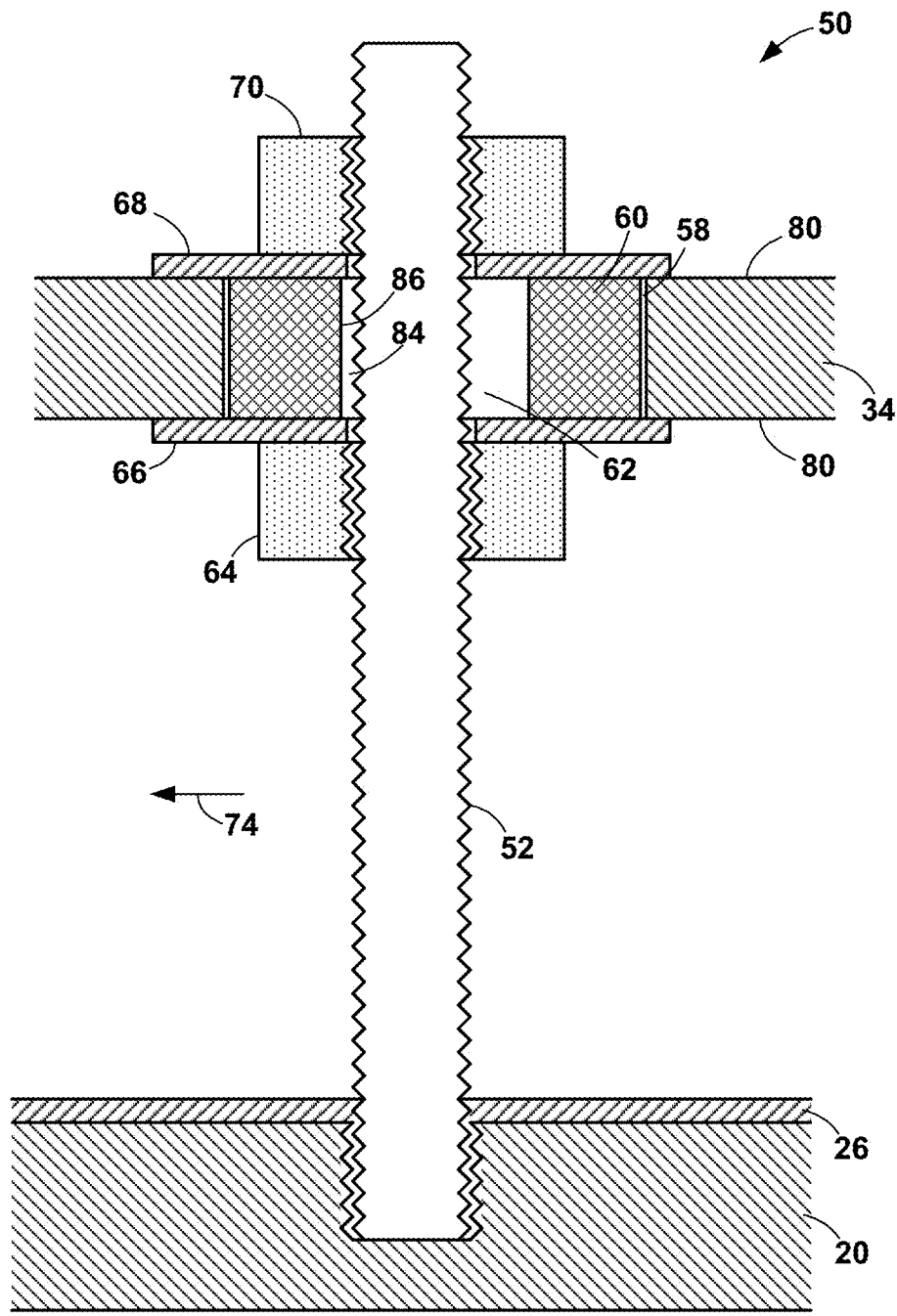
FIG. 15 is a cross-section of the configuration of FIG. 14 after expansion.

In the configuration of FIG. 14, the outer diameter of the sleeve 60 is the same size as the diameter of the coupler hole 58 so the sleeve 60 does not move within the coupler hole 58. The diameter 94 of the bore 62 is larger than the diameter 96 of the threaded rod 52 so that there is a gap 84 between the bore wall 86 and the threaded rod 52.

Heating the platen 20 causes the platen 20 to expand in a direction 74 while the beam 34 does not expand. The expansion causes the threaded rod 52 to move in the expansion direction 74. The gap 84 between the threaded rod 52 and the bore wall 86 allows the threaded rod 52 to move in the expansion direction 74, as in FIGS. 15 and 17. The washers 66, 68, sleeve 60, and/or beam surfaces 80 are composed of or coated with a non-stick material so the washers 66, 68 do not bind on the sleeve 60 and beam surfaces 80. The minimum size 100 of the gap 84 is the maximum amount of expansion that the platen 20 is expected to exhibit and is determined by the material(s) of which the platen 20 is composed, as explained above.

Figure 16:
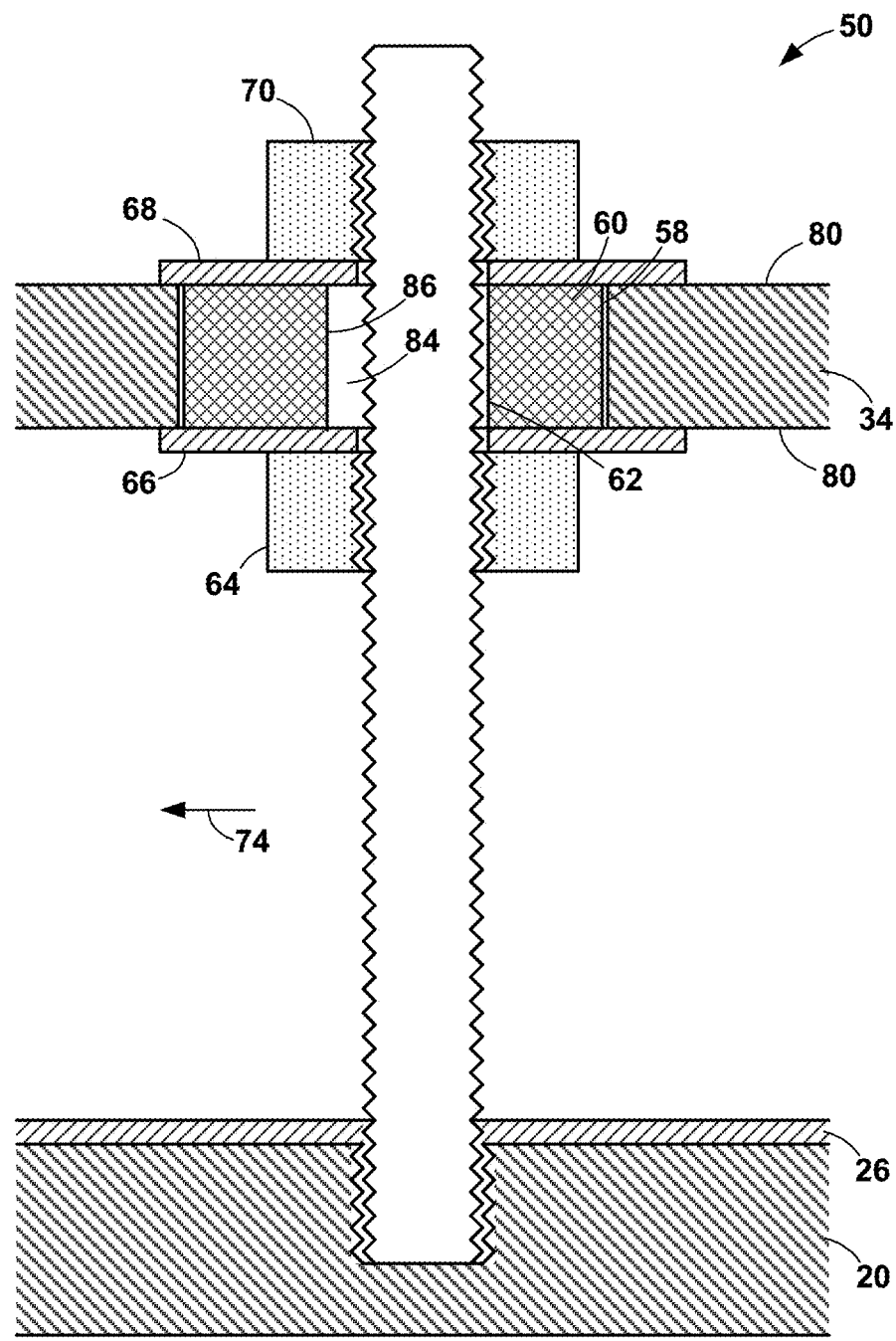
FIG. 16 is a cross-section of the second configuration of the expansion compensating assembly with an offset sleeve.
Figure 17:
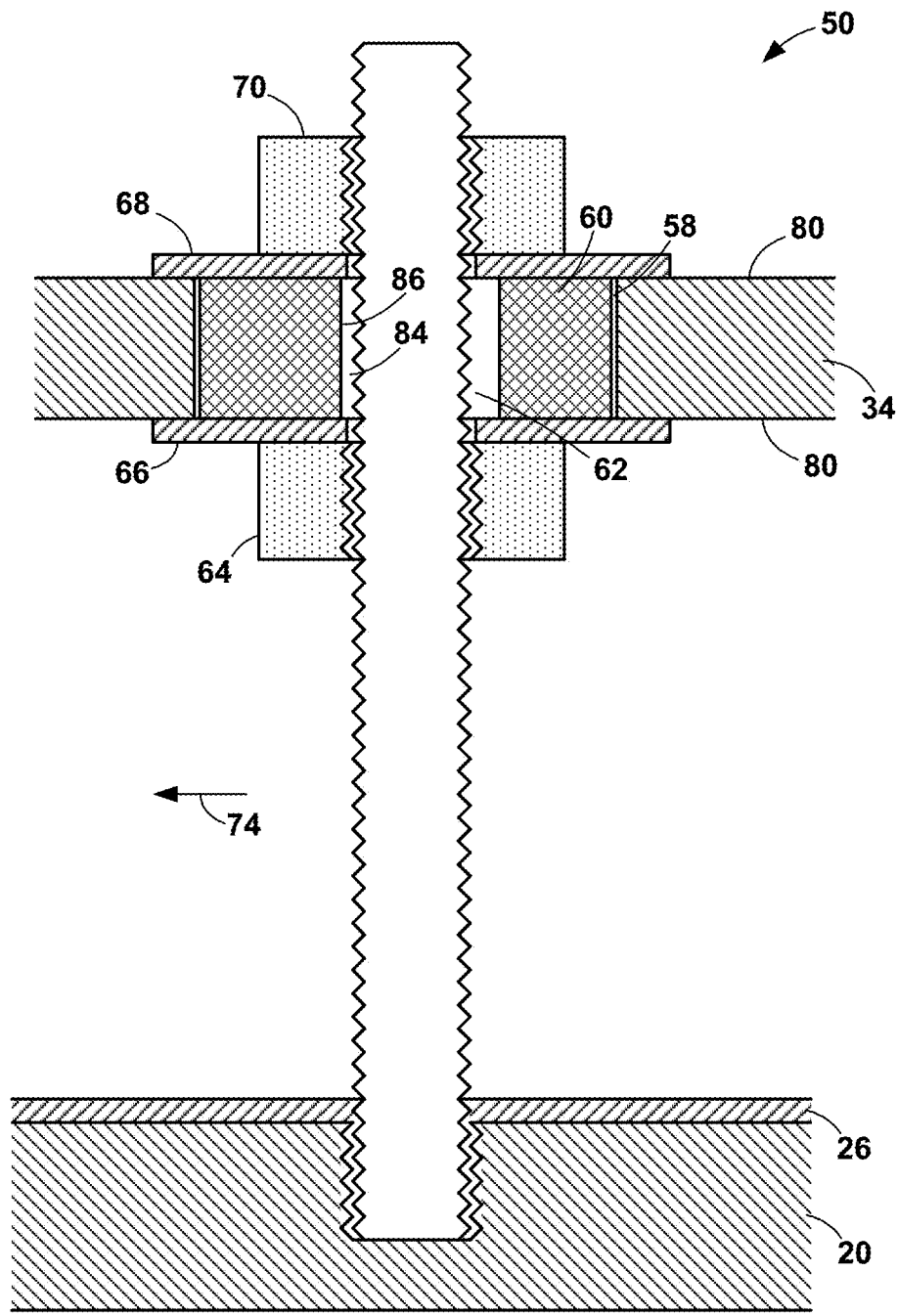
FIG. 17 is a cross-section of the configuration FIG. 16 after expansion.

In the configuration of FIG. 14, the threaded rod 52 is centrally positioned in the bore 62 when the platen 20 is not heated. In the configuration of FIG. 16, the threaded rod 52 is offset in the bore 62 away from the direction of the expansion 74. In this configuration, the bore 62 can be smaller by the size 100 of the gap 84. As explained above, this configuration is not preferred because the coupler 30 may not be able to compensate for temperatures lower than ambient.

A third configuration of the expansion compensating assembly 50 is shown in detail in FIGS. 18-21. The platen end 54 of the threaded rod 52 is attached to the platen 20 as explained above with reference to the first two configurations so that the threaded rod 52 is perpendicular to the platen 20. From nearest to the platen 20 (moving up in the figures from the threaded rod platen end 54 to the frame end 56), a distal nut 64 is turned onto the threaded rod 52, a distal washer 66 is placed on the threaded rod 52, the threaded rod 52 is inserted through a coupler hole 58 at the expansion point 46, a proximal washer 68 is placed on the threaded rod 52, and a proximal nut 70 is turned onto the threaded rod 52. The outer diameter 98 of washers 66, 68 is at least as large as the diameter 90 of the coupler hole 58. The distal nuts 64 of all of the expansion compensating assemblies 50 are adjusted on the threaded rods 52 so that the two platens 20 are parallel to each other when compressing dough, and then the proximal nuts 70 are tightened to secure the platen 20 to the frame beams 34.

The coupler hole 58 has a larger diameter than the threaded rod 52 so that there is a gap 88 between the threaded rod 52 and hole wall 78.

Heating the platen 20 causes the platen 20 to expand in a direction 74 while the beam 34 does not expand. The expansion causes the threaded rod 52 to move in the expansion direction 74. The gap 88 between the threaded rod 52 and the hole wall 78 allows the threaded rod 52 to move in the expansion direction 74 within the coupler hole 58 with the washers 66, 68 sliding on the outer surfaces 80 of the beam 34, as in FIGS. 19 and 21. The washers 66, 68 are composed of or coated with a non-stick material so they do not bind on the beam surfaces 80. The minimum size of the gap 88 is the maximum amount of expansion that the platen 20 is expected to exhibit and is determined by the material(s) of which the platen 20 is composed, as explained above.

Figure 18:
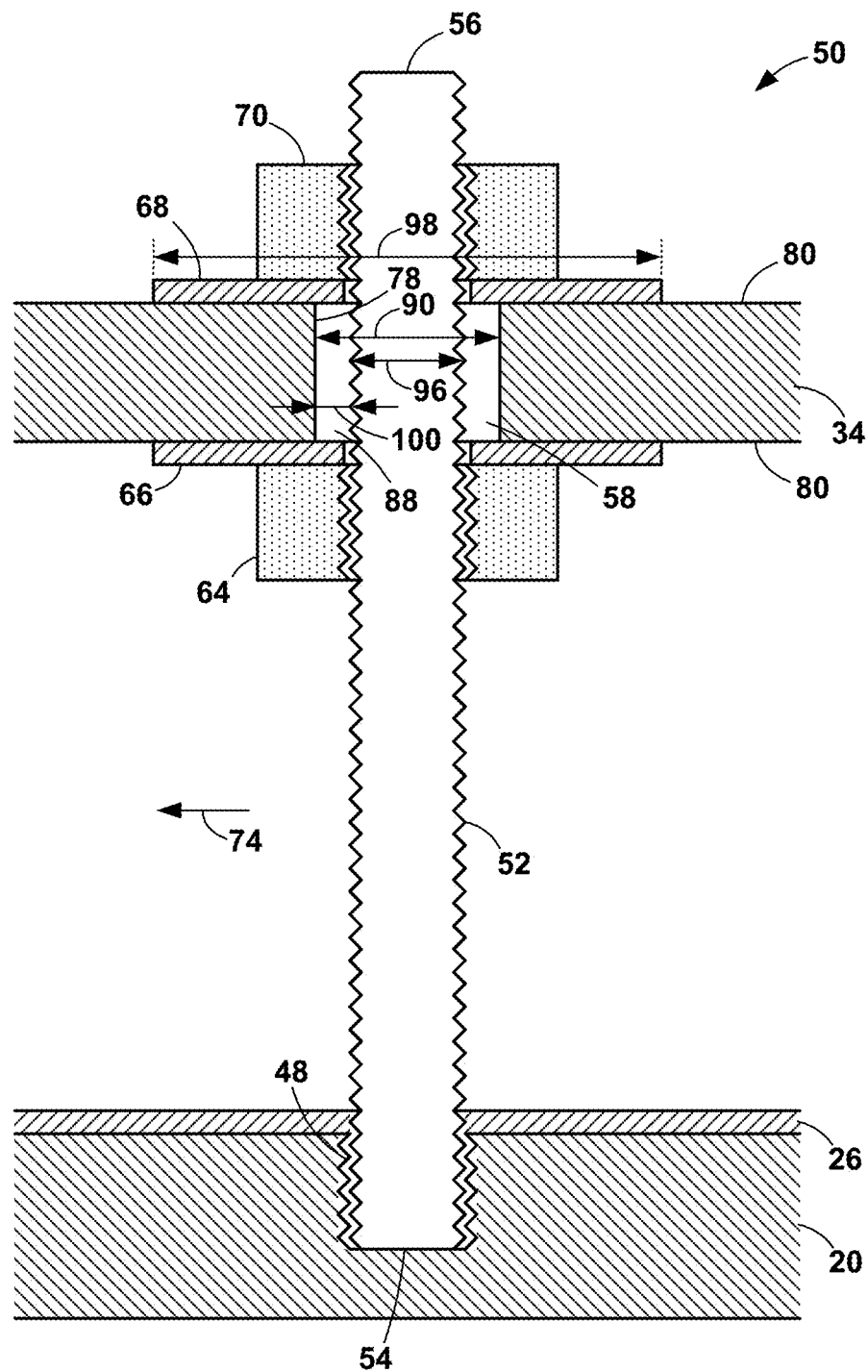
FIG. 18 is a cross-section of a third configuration of the expansion compensating assembly.
Figure 19:
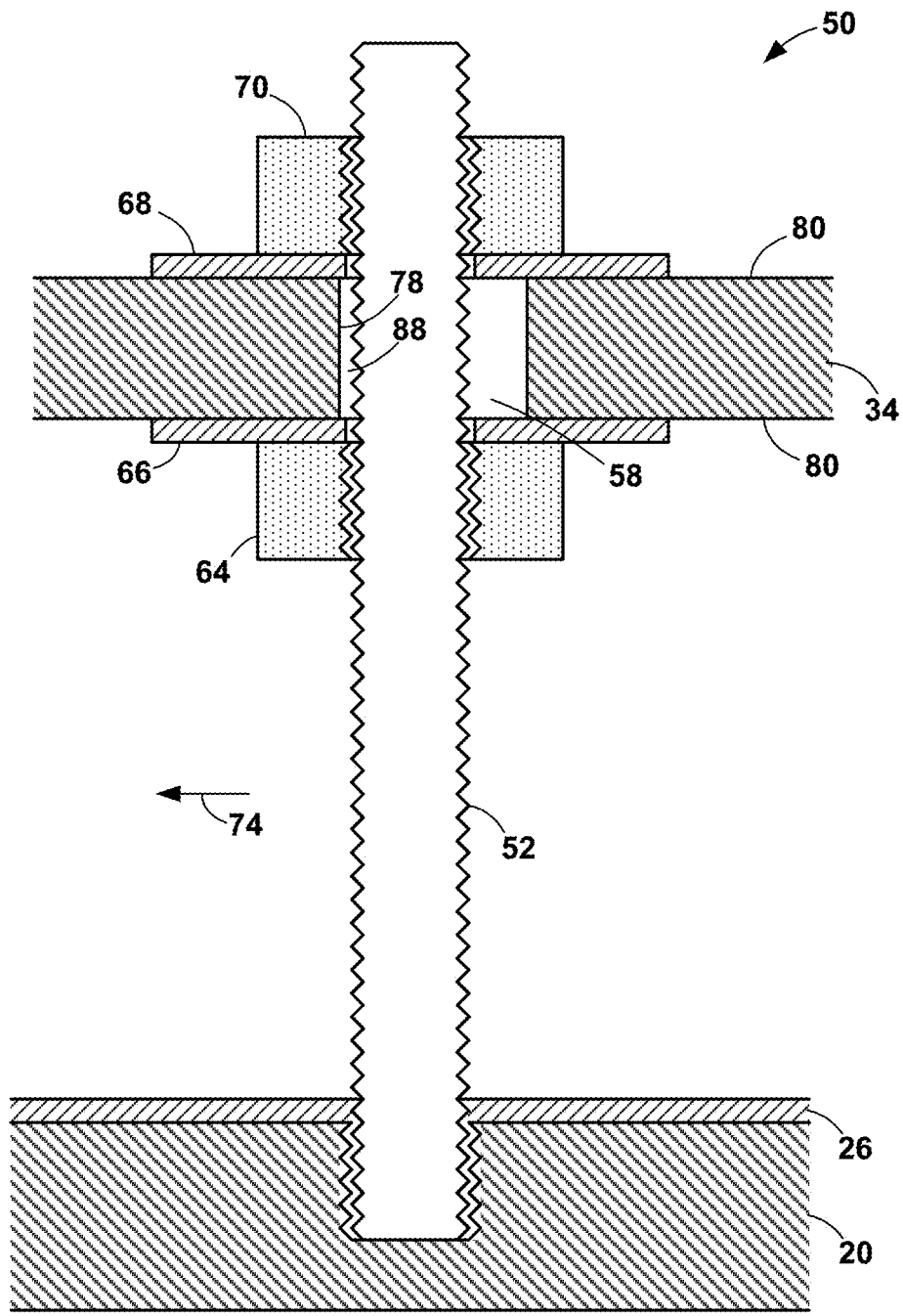
FIG. 19 is a cross-section of the configuration of FIG. 18 after expansion.
Figure 20:
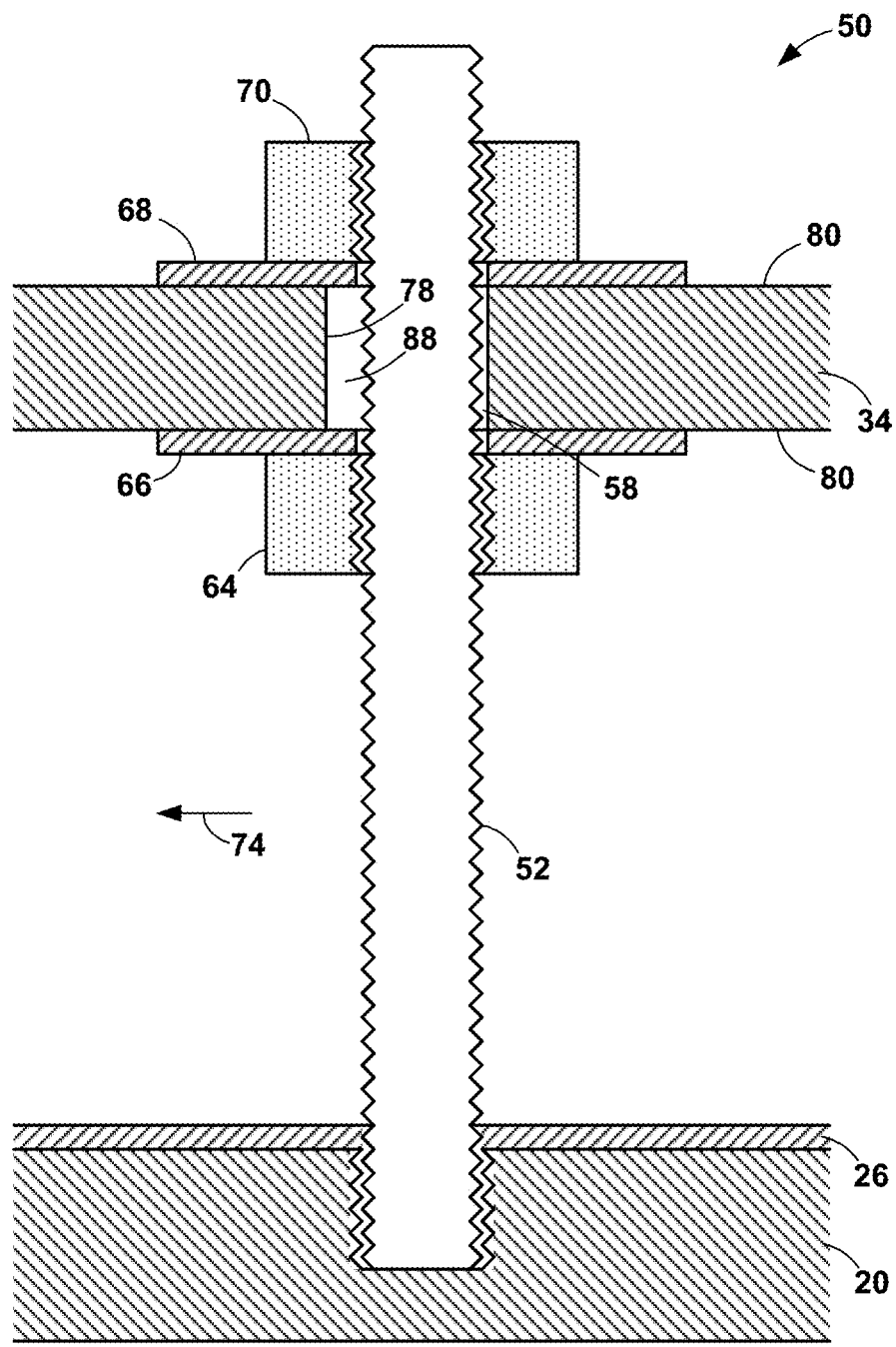
FIG. 20 is a cross-section of the third configuration of the expansion compensating assembly with an offset threaded rod.
Figure 21:
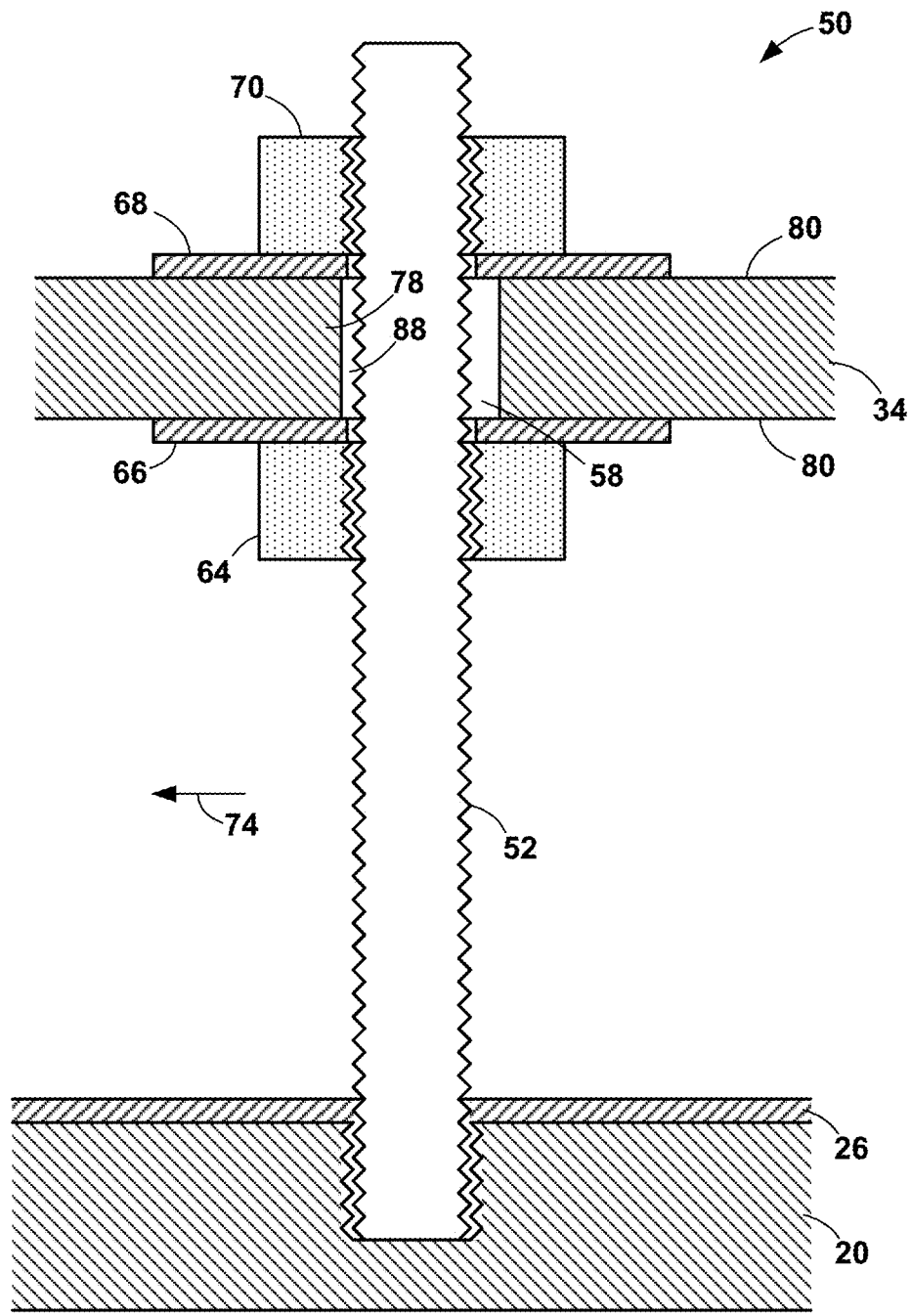
FIG. 21 is a cross-section of the configuration of FIG. 20 after expansion.

In the configuration of FIG. 18, the threaded rod 52 is centrally positioned in the coupler hole 58 when the platen 20 is not heated. In the configuration of FIG. 20, the threaded rod 52 is offset in the coupler hole 58 away from the direction of the expansion 74. In this configuration, the coupler hole 58 can be smaller by the size of the gap 88. As explained above, this configuration is not preferred because the coupler 30 may not be able to compensate for temperatures lower than ambient.

Figure 22:
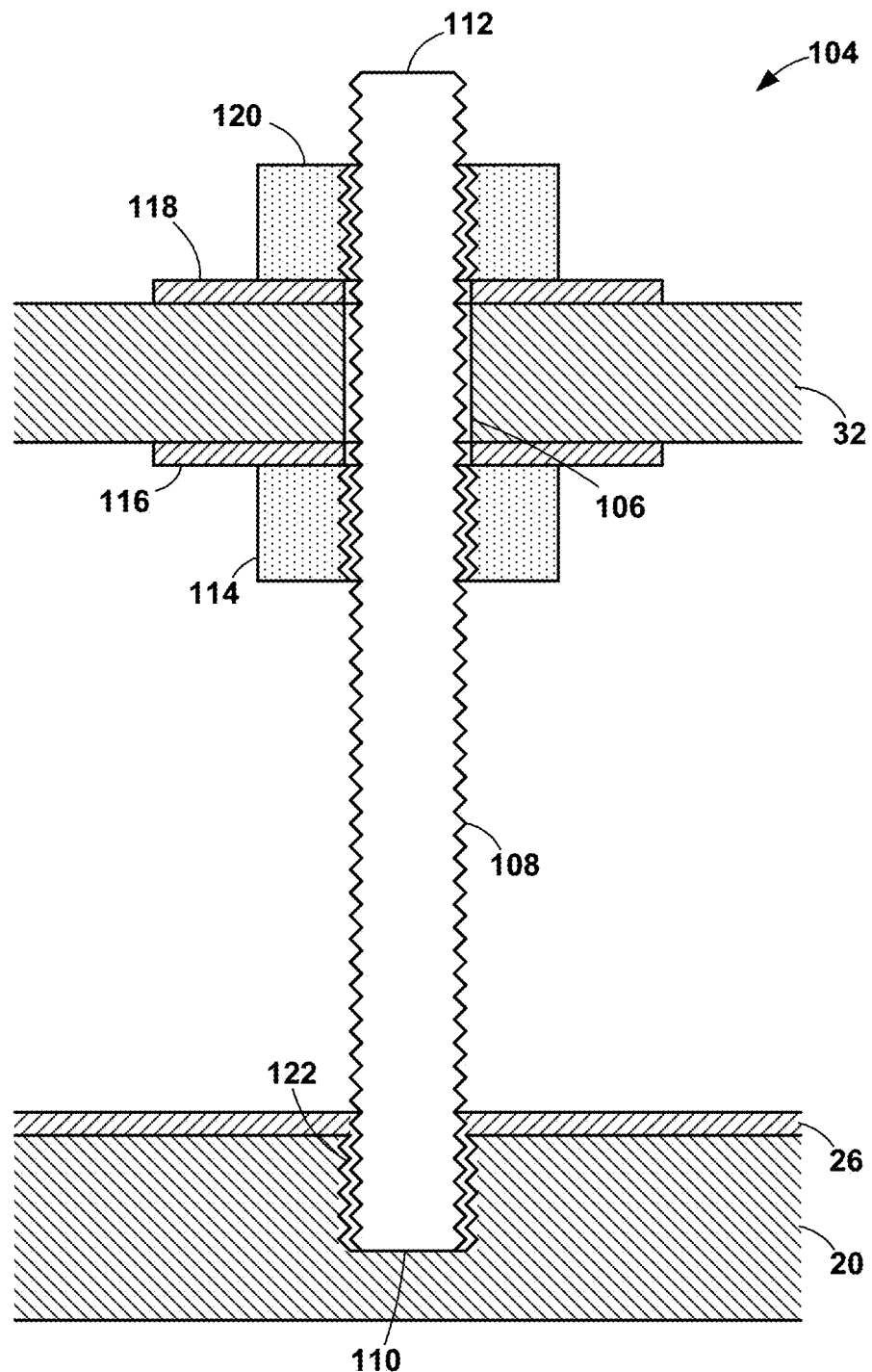
FIG. 22 is a cross-section of fixed attachment.

The fixed attachment 104, shown in FIG. 22, is similar to the third configuration of the expansion compensating assembly 50 of FIGS. 18-21. The platen end 110 of the fixed attachment rod 108 is attached to the platen 20 as explained above with reference to the expansion compensating assemblies 50 so that the fixed attachment rod 108 is perpendicular to the platen 20. In the illustrated attachment, the fixed attachment rod 108 is turned into a threaded hole 122 in the platen 20. From nearest to the platen 20 (moving up in the figures from the threaded rod platen end 110 to the frame end 112), a distal nut 114 is turned onto the fixed attachment rod 108, a distal washer 116 is placed on the fixed attachment rod 108, the fixed attachment rod 108 is inserted through a fixed attachment hole 106, a proximal washer 118 is placed on the fixed attachment rod 108, and a proximal nut 120 is turned onto the fixed attachment rod 108. The diameter of the attachment hole 106 is the same as the diameter of the fixed attachment rod 108. Consequently, the fixed attachment 104 does not compensate for expansion of the platen 20.

The distal nuts 114 of all of the fixed attachments 104 are adjusted on the fixed attachment rods 108 (along with the distal nuts 64 on the threaded rods 52) to correctly position the platen 20 relative to the beams 32 and then the proximal nuts 120 are tightened to secure the platen 20 to the beams 20.

Thus, it has been shown and described a heated platen expansion compensator for a dough press. Since certain changes may be made in the present disclosure without departing from the scope of the present invention, it is intended that all matter described in the foregoing specification and shown in the accompanying drawings be interpreted as illustrative and not in a limiting sense.

The invention claimed is:

1. A dough press comprising:
   (a) a base, an upper platen attached to an upper frame attached to the base, and a lower platen attached to a lower frame attached to the base, at least one of the platens being a heated platen;
   (b) an expansion compensating coupler for attaching the heated platen to its corresponding frame, the expansion compensating coupler including at least two expansion compensating assemblies, each expansion compensating assembly comprising:
      (1) a threaded rod attached to the heated platen;
      (2) a coupler hole with a diameter and a length in the corresponding frame;
      (3) a sleeve in the coupler hole, the sleeve having a length, coaxial bore, and an outer diameter smaller than the coupler hole diameter; and
      (4) in order moving away from the platen, a distal nut turned onto the threaded rod, a distal washer on the threaded rod, the threaded rod extending through the bore, a proximal washer on the threaded rod, and a proximal nut turned onto the threaded rod;
      (5) whereby the distal nut and proximal nut are tightened to secure the platen to the corresponding frame and whereby, when the heated platen is heated and expands, the diameter of the coupler hole is larger enough relative to the outer diameter of the sleeve to permit the sleeve to move outwardly within the coupler hole, thereby preventing warping of the platen.

2. The dough press of claim 1 wherein the length of the sleeve is slightly greater than the length of the coupler hole such that the washers do not bind on the frame.

3. The dough press of claim 1 wherein, when the heated platen is not heated, the sleeve is generally coaxial with the coupler hole.

4. The dough press of claim 1 wherein the threaded rod is attached to the platen by turning the threaded rod into a threaded hole in the platen.

5. The dough press of claim 1 wherein the expansion compensating assemblies are equally distributed around the heated platen.

6. A dough press comprising:
   (a) a base, an upper platen attached to an upper frame attached to the base, and a lower platen attached to a lower frame attached to the base, at least one of the platens being a heated platen;
   (b) an expansion compensating coupler for attaching the heated platen to its corresponding frame, the expansion compensating coupler including at least two expansion compensating assemblies, each expansion compensating assembly comprising:
   (1) a threaded rod with a diameter attached to the heated platen;
   (2) a coupler hole in the corresponding frame;
   (3) a sleeve in the coupler hole, the sleeve having a length, and a coaxial bore with a diameter larger than the threaded rod diameter; and
   (4) in order moving away from the platen, a distal nut turned onto the threaded rod, a distal washer on the threaded rod, the threaded rod extending through the bore, a proximal washer on the threaded rod, and a proximal nut turned onto the threaded rod;
   (5) whereby the distal nut and proximal nut are tightened to secure the platen to the corresponding frame and whereby, when the heated platen is heated and expands, the diameter of the bore is larger enough relative to the diameter of the threaded rod to permit the threaded rod to move outwardly within the bore, thereby preventing warping of the platen.

7. The dough press of claim 6 wherein, when the heated platen is not heated, the threaded rod is generally coaxial with the bore.

8. The dough press of claim 6 wherein the threaded rod is attached to the platen by turning the threaded rod into a threaded hole in the platen.

9. The dough press of claim 6 wherein the expansion compensating assemblies are equally distributed around the heated platen.

10. A dough press comprising:
    (a) a base, an upper platen attached to an upper frame attached to the base, and a lower platen attached to a lower frame attached to the base, at least one of the platens being a heated platen;
    (b) an expansion compensating coupler for attaching the heated platen to its corresponding frame, the expansion compensating coupler including at least two expansion compensating assemblies, each expansion compensating assembly comprising:
    (1) a threaded rod with a diameter attached to the heated platen;
    (2) a coupler hole in the corresponding frame with a diameter larger than the threaded rod diameter;
    (3) in order moving away from the platen, a distal nut turned onto the threaded rod, a distal washer on the threaded rod, the threaded rod extending through the coupler hole, a proximal washer on the threaded rod, and a proximal nut turned onto the threaded rod;
    (4) whereby the distal nut and proximal nut are tightened to secure the platen to the corresponding frame and whereby, when the heated platen is heated and expands, the diameter of the coupler hole is larger enough relative to the diameter of the threaded rod to permit the threaded rod to move outwardly within the coupler hole, thereby preventing warping of the platen.

11. The dough press of claim 10 wherein, when the heated platen is not heated, the threaded rod is generally coaxial with the coupler hole.

12. The dough press of claim 10 wherein the threaded rod is attached to the platen by turning the threaded rod into a threaded hole in the platen.

13. The dough press of claim 10 wherein the expansion compensating assemblies are equally distributed around the heated platen.

* * * * *